United States Patent
Franzke et al.

(10) Patent No.: US 11,276,009 B2
(45) Date of Patent: Mar. 15, 2022

(54) USING NOISE TO SPEED CONVERGENCE OF SIMULATED ANNEALING AND MARKOV MONTE CARLO ESTIMATIONS

(71) Applicant: University of Southern California, Los Angeles, CA (US)

(72) Inventors: Brandon Franzke, Los Angeles, CA (US); Bart Kosko, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 732 days.

(21) Appl. No.: 15/751,078

(22) PCT Filed: Aug. 8, 2016

(86) PCT No.: PCT/US2016/046006
§ 371 (c)(1),
(2) Date: Feb. 7, 2018

(87) PCT Pub. No.: WO2017/069835
PCT Pub. Date: Apr. 27, 2017

(65) Prior Publication Data
US 2020/0090071 A1   Mar. 19, 2020

Related U.S. Application Data

(60) Provisional application No. 62/202,613, filed on Aug. 7, 2015.

(51) Int. Cl.
*G06N 10/00* (2019.01)
*G06N 7/00* (2006.01)
*G06F 17/18* (2006.01)

(52) U.S. Cl.
CPC ............ *G06N 10/00* (2019.01); *G06F 17/18* (2013.01); *G06N 7/005* (2013.01)

(58) Field of Classification Search
CPC ...................................................... G06N 20/00
USPC ...................................................... 706/15, 45
See application file for complete search history.

(56) References Cited

U.S. PATENT DOCUMENTS

| 7,547,367 | B2 | 6/2009 | Suortti et al. | |
|---|---|---|---|---|
| 8,744,185 | B2 | 6/2014 | Chang et al. | |
| 2004/0210417 | A1* | 10/2004 | Zakrzewski | G06N 3/08 702/181 |
| 2005/0105682 | A1* | 5/2005 | Heumann | G01N 23/046 378/58 |
| 2010/0030721 | A1* | 2/2010 | Candy | G06N 7/005 706/52 |

(Continued)

OTHER PUBLICATIONS

Alquier et al. "Noisy Monte Carlo: Convergence of Markov chains with approximate transition kernels." In arXiv:1403.5496 [Stat. ME], Apr. 15, 2014 [online] Retrieved from the Internet <URL: https://arxiv.org/abs/1403.5496>.

(Continued)

*Primary Examiner* — David R Vincent
(74) *Attorney, Agent, or Firm* — Brooks Kushman P.C.

(57) ABSTRACT

The invention shows how to use noise-like perturbations to improve the speed and accuracy of Markov Chain Monte Carlo (MCMC) estimates and large-scale optimization, simulated annealing optimization, and quantum annealing for large-scale optimization.

13 Claims, 14 Drawing Sheets

(56) References Cited

U.S. PATENT DOCUMENTS

2014/0025356 A1   1/2014  Kosko et al.
2014/0304106 A1*  10/2014 Dahan ................ G06Q 30/0631
                                                    705/26.7

OTHER PUBLICATIONS

Franzke et al. "Using Noise to Speed up Markov Chain Monte Carlo Estimation." Procedia Computer Science vol. 52, pp. 113-120, Aug. 8-10, 2015 [online] <URL:https://doi.org/10.1016/j.procs.2015.07.285>.
International Search Report and Written Opinion prepared by the ISA/US for priority application PCT/US16/46006 dated May 24, 2017.

* cited by examiner

USING NOISE TO SPEED CONVERGENCE OF SIMULATED ANNEALING AND MARKOV MONTE CARLO ESTIMATIONS

CROSS-REFERENCE TO RELATED APPLICATION

This application is based upon and claims priority to International Patent Application No. PCT/US2016/046006, entitled "Using Noise to Speed Convergence of Simulated Annealing and Markov Monte Carlo Estimation," filed Aug. 7, 2016, which claims priority to U.S. provisional patent application 62/202,613, entitled "Noise Can Speed Convergence of Simulated Annealing and Markov Monte Carlo Estimation," filed Aug. 7, 2015. The entire content of this application is incorporated herein by reference.

BACKGROUND

Technical Field

This disclosure relates to the injection of noise in simulated annealing and Markov chain Monte Carlo ("MCMC") estimations.

Description of Related Art

The speed and accuracy of Markov Chain Monte Carlo (MCMC) estimates and large-scale optimization, simulated annealing optimization, and quantum annealing for large-scale optimization, can be an important.

MCMC applications arose in the early 1950s when physicists modeled intense energies and high particle dimensions involved in the design of thermonuclear bombs. These simulations ran on the first ENIAC and MANIAC computers [N. Metropolis, A. W. Rosenbluth, M. N. Rosenbluth, A. H. Teller, and E. Teller. Equations of state calculations by fast computing machines. Journal of Chemical Physics, 21:1087-1091, 1953]. Some refer to this algorithm as the Metropolis algorithm or the Metropolis-Hastings algorithm after Hastings' modification to it in 1970 [W. K. Hastings. Monte Carlo sampling methods using Markov chains and their applications. Biometrika, 57:97-109, 1970]. The original 1953 paper [N. Metropolis, A. W. Rosenbluth, M. N. Rosenbluth, A. H. Teller, and E. Teller. Equations of state calculations by fast computing machines. Journal of Chemical Physics, 21:1087-1091, 1953]. The original 1953 paper [N. Metropolis, A. W. Rosenbluth, M. N. Rosenbluth, A. H. Teller, and E. Teller. Equations of state calculations by fast computing machines. Journal of Chemical Physics, 21:1087-1091, 1953] computed thermal averages for 224 hard spheres that collided in the plane. Its high-dimensional state space was $\mathbb{R}^{448}$. So even standard random-sample Monte Carlo techniques were not feasible.

The name "simulated annealing" has become used since Kirkpatrick's work on spin glasses and VLSI optimization in 1983 for MCMC that uses a cooling schedule [Scott Kirkpatrick, Mario P. Vecchi, and C. D. Gelatt. Optimization by simulated annealing. Science, 220(4598):671-680, 1983]. Quantum annealing has more recently arisen as a way to use quantum tunneling to burrow through cost surfaces in search of global minima rather than (as with classical simulated annealing) thermally guiding a random search that bounces in and out of shallower minima. Google's Quantum AI team recently [Vasil S. Denchev, Sergio Boixo, Sergei V. Isakov, Nan Ding, Ryan Babbush, Vadim Smelyanskiy, John Martinis, Hartmut Neven. What is the Computational Value of Finite Range Tunneling?. Arxiv, arXiv:1512.02206 [quant-ph]] showed that quantum annealing can often substantially outperform classical annealing in optimization. But this work suffered from slowness in search convergence and inaccurate and poor of search results. Both classical and quantum annealing often failed to converge at all.

SUMMARY

A quantum or classical computer system may iteratively estimate a sample statistic from a probability density of a model or from a state of a system. An input module may have a configuration that receives numerical data about the system. A noise module may have a configuration that generates random, chaotic, or other type of numerical perturbations of the received numerical data or that generates pseudo-random noise. An estimation module may have a configuration that iteratively estimates the sample statistic from a probability density of the model or from the state of the system based on the numerical perturbations or the pseudo-random noise and the input numerical data during at least one of the iterative estimates of the sample statistic. A signaling module may have a configuration that signals when successive estimates of the sample statistic or information derived from successive estimates of the sample statistic differ by less than a predetermined signaling threshold or when the number of estimation iterations reaches a predetermined number or when the length of time since commencing the iterative estimation meets or exceeds a threshold. The estimation module may have a configuration that estimates the sample statistic from a probability density of the model or state of the system using Markov chain Monte Carlo, Gibbs sampling, quantum annealing, simulated quantum annealing, or another statistical sampling, or sub-sampling method. The noise module may have a configuration that generates random, chaotic, or other type of numerical perturbations of the input numerical data that fully or partially satisfy a noisy Markov chain Monte Carlo (N-MCMC) condition. The estimation module may have a configuration that estimates the sample statistic from a probability density of the model or state of the system by adding, multiplying, or otherwise combining the received numerical data with the numerical perturbations. The produced samples may be used in one of nonlinear signal processing, statistical signal processing, statistical numerical processing, or statistical analysis.

The estimation module may have a configuration that causes the magnitude of the generated numerical perturbations to eventually decay during successive estimates of the sample statistic.

The noise module may have a configuration that generates numerical perturbations that do not depend on the received numerical data. The estimation module may have a configuration that estimates the sample statistic from a probability density of the model or from the state of the system using the numerical perturbations that do not depend on the received numerical data.

A quantum or classical computer system may iteratively generate statistical samples from a probability density of a model or from a state of a system. An input module may have a configuration that receives numerical data about the system. A noise module may have a configuration that generates random, chaotic, or other type of numerical perturbations of the received numerical data or that generates pseudo-random noise. A sampler module may have a configuration that iteratively generates statistical samples from a probability density of the model or from the state of the system based on the numerical perturbations or the pseudo-random noise and the input numerical data during at least one of the iterative samplings from the probability density. A signaling module may have a configuration that signals when information derived from successive samples of the probability density differ by less than a predetermined signaling threshold or when the number of iterations reaches a predetermined number. The sampler module may have a configuration that samples from a probability density of the model or state of the system using Markov chain Monte Carlo, Gibbs sampling, quantum annealing, simulated quantum annealing, or another statistical sampling, or sub-sampling method. The noise module may have a configuration that generates random, chaotic, or other type of numerical perturbations of the input numerical data that fully or partially satisfy a noisy Markov chain Monte Carlo (N-MCMC) condition. The sampler module may have a configuration that samples from a probability density of the model or state of the system by adding, multiplying, or otherwise combining the received numerical data with the numerical perturbations. The produced samples may be used in one of nonlinear signal processing, statistical signal processing, statistical numerical processing, or statistical analysis.

The sampler module may have a configuration that causes the magnitude of the generated numerical perturbations to eventually decay during successive estimates of the sample statistic.

The noise module may have a configuration that generates numerical perturbations that do not depend on the received numerical data. The sampler module may have a configuration that generates statistical samples from a probability density of the model or from the state of the system using the numerical perturbations that do not depend on the received numerical data.

A quantum or classical computer system may iteratively estimate the optimal configuration of a model or state of a system. An input module may have a configuration that receives numerical data about the system. A noise module may have a configuration that generates random, chaotic, or other type of numerical perturbations of the received numerical data or that generates pseudo-random noise. An estimation module may have a configuration that iteratively estimates the optimal configuration of the model or state of the system based on the numerical perturbations or the pseudo-random noise and the input numerical data during at least one of the iterative estimates of the optimal configuration. A signaling module may have a configuration that signals when successive estimates of the optimal configuration or information derived from successive estimates of the optimal configuration differ by less than a predetermined signaling threshold or when the number of estimation iterations reaches a predetermined number or when the length of time since commencing the iterative estimation meets or exceeds a threshold. The estimation module may have configuration that estimates the optimal configuration of the model or state of the system using Markov chain Monte Carlo, simulated annealing, quantum annealing, simulated quantum annealing, quantum simulated annealing, or another statistical optimization or sub-optimization method. The noise module may have a configuration that generates random, chaotic, or other type of numerical perturbations of the input numerical data that fully or partially satisfy a noisy Markov chain Monte Carlo (N-MCMC), noisy simulated annealing (N-SA), or noisy quantum annealing (N-QA) condition. The estimation module may have a configuration that estimates the optimal configuration of the system by adding, multiplying, or otherwise combining the received numerical data with the numerical perturbations. The optimal configuration estimates may be used in one of nonlinear signal processing, statistical signal processing, nonlinear optimization, or noise enhanced search.

The estimation module may have a configuration that causes the magnitude of the generated numerical perturbations to eventually decay during successive estimates of the sample statistic.

The noise module may have a configuration that generates numerical perturbations that do not depend on the received numerical data. The estimation module may have a configuration that estimates the optimal configuration of the model or state of the system using the numerical perturbations that do not depend on the received numerical data.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2A illustrate the search without noise; while FIG. 2B illustrates the search with noise.

DETAILED DESCRIPTION OF ILLUSTRATIVE EMBODIMENTS

Figure 1:
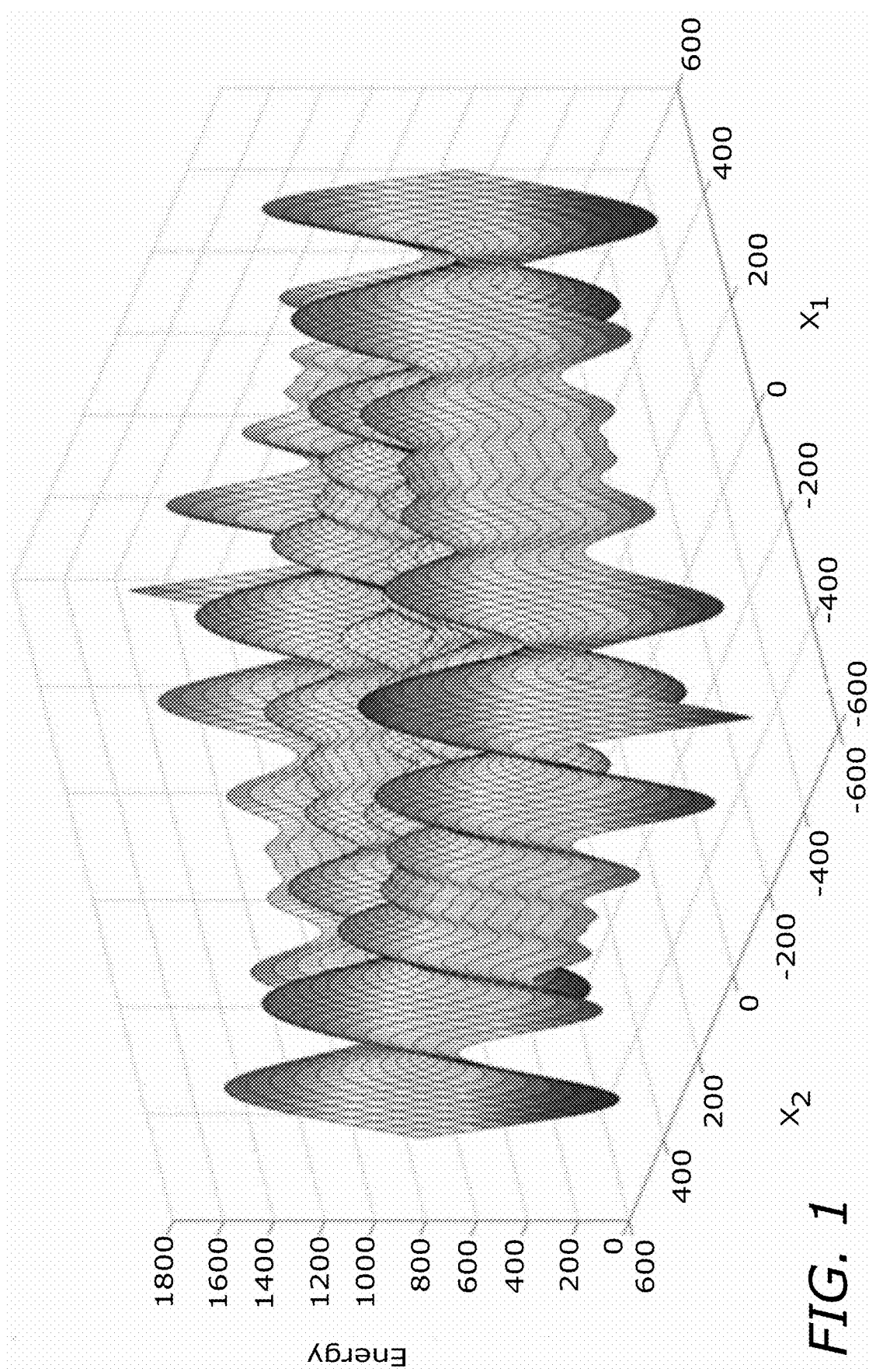
FIG. 1 illustrates Schwefel function in 2 dimensions.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Carefully injected noise can speed the average convergence of Markov chain Monte Carlo (MCMC) simulation estimates and simulated annealing optimization. This noise-boost may include quantum-annealing search and the MCMC special cases of the Metropolis-Hastings algorithm and Gibbs sampling. The noise may make the underlying search more probable given the constraints. MCMC may equate the solution to a computational problem with the equilibrium probability density of a reversible Markov chain. The algorithm may cycle through a long burn-in period until it reaches equilibrium because the Markov samples are statistically correlated. The injected noise may reduce this burn-in period.

A related theorem may reduce the cooling time in simulated annealing. Simulations show that optimal noise may give a 76% speed-up in finding the global minimum in the Schwefel optimization benchmark. In one test, the noise-boosted simulations found the global minimum in 99.8% of trials, compared with 95.4% in noiseless simulated annealing. The simulations also show that the noise boost is robust to accelerated cooling schedules and that noise decreases convergence times by more than 32% under aggressive geometric cooling.

Molecular dynamics simulations showed that optimal noise gave a 42% speed-up in finding the minimum potential energy configuration of an 8-argon atom gas system with a Lennard-Jones 12-6 potential. The annealing speed-up may also extend to quantum Monte Carlo implementations of quantum annealing. Noise improved ground-state energy estimates in a 1024-spin simulated quantum annealing simulation by 25.6%. It has been demonstrated that the Noisy MCMC algorithm brings each Markov step closer on average to equilibrium if an inequality holds between two expectations. Gaussian or Cauchy jump probabilities may reduce the inequality to a simple quadratic condition. It has also been demonstrated that noise-boosted simulated annealing may increase the likelihood that the system will sample high-probability regions and accept solutions that increase the search breadth based on the sign of an expectation. Noise-boosted annealing may lead to noise-boosted quantum annealing. The injected noise may flip spins along Trotter rings. Noise that obeyed the noisy-MCMC condition may improve the ground state solution by 25.6% and reduce the quantum-annealing simulation time by many orders of magnitude.

It has been demonstrated that carefully injected noise can speed convergence in Markov Chain Monte Carlo (MCMC) simulations and related stochastic models. The injected noise may not be simple blind or dither noise.

The noise may be just that noise that makes a search jump more probable and that obeys a Markov constraint. Such noise may satisfy an ensemble-average inequality that enforces the detailed-balance conditions of a reversible Markov chain. The noise may perturb the current state and, on average, reduce the Kullback-Liebler pseudo-distance to the desired equilibrium probability density function. This may lead to a shorter "burn in" time before the user can safely estimate integrals or other statistics based on sample averages as in regular Monte Carlo simulation.

The MCMC noise boost may extend to simulated annealing with different cooling schedules. It may also extend to quantum annealing that burrows or tunnels through a cost surface, rather than thermally bounces over it as in classical annealing. The quantum-annealing noise may propagate the Trotter ring. It may conditionally flip the corresponding sites on coupled Trotter slices.

MCMC can be a powerful statistical optimization technique that exploits the convergence properties of Markov chains. It may work well on high-dimensional problems of statistical physics, chemical kinetics, genomics, decision theory, machine learning, quantum computing, financial engineering, and Bayesian inference [Steve Brooks, Andrew Gelman, Galin Jones, and Xiao-Li Meng. *Handbook of Markov Chain Monte Carlo*. CRC press, 2011]. Special cases of MCMC may include the Metropolis-Hastings algorithm and Gibbs sampling in Bayesian statistical inference.

MCMC can solve an inverse problem: How can the system reach a given solution from any starting point of the Markov chain?

MCMC can draw random samples from a reversible Markov chain and then computes sample averages to estimate population statistics. The designer may pick the Markov chain so that its equilibrium probability density function corresponds to the solution of a given computational problem. The correlated samples can require cycling through a long "burn in" period before the Markov chain equilibrates. Careful (non-blind) noise injection can speed up this lengthy burn-in period. It can also improve the quality of the final computational solutions.

MCMC simulation itself arose in the early 1950s when physicists modeled the intense energies and high particle dimensions involved in the design of thermonuclear bombs. These simulations ran on the first ENIAC and MANIAC computers [N. Metropolis, A. W. Rosenbluth, M. N. Rosenbluth, A. H. Teller, and E. Teller. Equations of state calculations by fast computing machines. *Journal of Chemical Physics,* 21:1087-1091, 1953]. Some refer to this algorithm as the Metropolis algorithm or the Metropolis-Hastings algorithm after Hastings' modification to it in 1970 [W. K. Hastings. Monte Carlo sampling methods using Markov chains and their applications. *Biometrika,* 57:97-109, 1970]. The original 1953 paper [N. Metropolis, A. W. Rosenbluth, M. N. Rosenbluth, A. H. Teller, and E. Teller. Equations of state calculations by fast computing machines. *Journal of Chemical Physics,* 21:1087-1091, 1953] computed thermal averages for 224 hard spheres that collided in the plane. Its high-dimensional state space was $R^{448}$. So even standard random-sample Monte Carlo techniques may not have been feasible. The name "simulated annealing" has become common since Kirkpatrick's work on spin glasses and VLSI optimization in 1983 for MCMC that uses a cooling schedule [Scott Kirkpatrick, Mario P. Vecchi, and C. D. Gelatt. Optimization by simulated annealing. *Science,* 220(4598): 671-680, 1983].

The Noisy MCMC (N-MCMC) algorithm below resembles earlier "stochastic resonance" work on using noise to speed up stochastic convergence. It has been shown how adding noise to a Markov chain's state density can speed convergence to the chain's equilibrium probability density π if π is known in advance [Brandon Franzke and Bart Kosko. Noise can speed convergence in Markov chains. *Physical Review E*, 84(4):041112, 2011]. But that noise did not add to the system state. Nor was it part of the MCMC framework that solves the following inverse problem: start with π and then find a Markov chain that leads to it.

The related Noisy Expectation-Maximization (NEM) algorithm shows on average how to boost each iteration of the EM algorithm as the estimator climbs to the top of the nearest hill on a likelihood surface [Osonde Osoba, Sanya Mitaim, and Bart Kosko. The noisy expectation—maximization algorithm. *Fluctuation and Noise Letters*, 12(03), 2013], [Osonde Osoba and Bart Kosko. The noisy expectation-maximization algorithm for multiplicative noise injection. *Fluctuation and Noise Letters*, page 1650007, 2016]. EM can be a powerful iterative algorithm that finds maximum-likelihood estimates when using missing or hidden variables. This result also showed how to speed up the popular backpropagation algorithm in neural networks, because it has been shown that the backpropagation gradient-descent algorithm can be a special case of the generalized EM algorithm [Kartik Audhkhasi, Osonde Osoba, and Bart Kosko. Noise-enhanced convolutional neural networks. *Neural Networks*, 78:15-23, 2016], [Kartik Audhkhasi, Osonde Osoba, and Bart Kosko. Noise benefits in backpropagation and deep bidirectional pre-training. In *Neural Networks (IJCNN), The 2013 International Joint Conference on*, pages 1-8. IEEE, 2013]. The same NEM algorithm can also boost the popular Baum-Welch method for training hidden Markov models in speech recognition and elsewhere [Kartik Audhkhasi, Osonde Osoba, and Bart Kosko. Noisy hidden Markov models for speech recognition. In *Neural Networks (IJCNN), The 2013 International Joint Conference on*, pages 1-6. IEEE, 2013] and boosts the k-means-clustering algorithm found in pattern recognition and big data [Osonde Osoba and Bart Kosko. Noise-enhanced clustering and competitive learning algorithms. *Neural Networks*, 37:132-140, 2013].

The N-MCMC algorithm and theorem stem from an intuition: Find a noise sample n that makes the next choice of location x+n more probable. Define the usual jump function Q(y|x) as the probability that the system moves or jumps to state y if it is in state x. The Metropolis algorithm may require a symmetric jump function: Q(y|x)=Q(x|y). This may help explain the common choice of a Gaussian jump function. Neither the Metropolis-Hastings algorithm nor the N-MCMC results may require symmetry. But all MCMC algorithms may require that the chain is reversible. Physicists call this detailed balance:

$$Q(y|x)\pi(x) = Q(x|y)\pi(y) \qquad (0)$$

for all x and y.

Now consider a noise sample n that makes the jump more probable: Q(y|x+n)≥Q(y|x). This is equivalent to ln $$\frac{Q(y|x+n)}{Q(y|x)} \geq 0.$$

Replace the denominator jump term with its symmetric dual Q(x|y). Then eliminate this term with detailed balance and rearrange to get the key inequality for a noise boost:

$$\ln\frac{Q(y|x+n)}{Q(y|x)} \geq \ln\frac{\pi(x)}{\pi(y)}. \qquad (0)$$

Taking expectations over the noise random variable N and over X gives a simple symmetric version of the sufficient condition in the Noisy MCMC Theorem for a speed-up:

$$E_{N,X}\left[\ln\frac{Q(y|x+N)}{Q(y|x)}\right] \geq E_X\left[\ln\frac{\pi(x)}{\pi(y)}\right]. \qquad (0)$$

The inequality ((0)) has the form A≥B and so generalizes the structurally similar sufficient condition A≥0 that governs the NEM algorithm [Osonde Osoba, Sanya Mitaim, and Bart Kosko. The noisy expectation—maximization algorithm. *Fluctuation and Noise Letters*, 12(03), 2013]. This is natural since the EM algorithm deals with only the likelihood term P(E|H) on the right side of Bayes Theorem:

$$P(H|E) = \frac{P(H)P(E|H)}{P(E)}$$

for hypothesis H and evidence E. MCMC deals with the converse posterior probability P(H|E) on the left side. The posterior requires the extra prior P(H). This accounts for the right-hand side of (0).

The next sections review MCMC and then extend it to the noise-boosted case. Theorem 1 proves that, at each step, the noise-boosted chain is closer on average to the equilibrium density than is the noiseless chain. Theorem 2 proves that noisy simulated annealing increases the sample acceptance rate to exploit the noise-boosted chain. The first corollary uses an exponential term to weaken the sufficient condition. The next two corollaries state a simple quadratic condition for the noise boost when the jump probability is either a Gaussian or Cauchy bell curve. A Cauchy bell curve has thicker tails than a Gaussian and thus tends to have longer jumps. The Cauchy curve has infinite variance because of these thicker tails. So it can produce occasional jumps that are extremely long. The corresponding Gaussian bell curve gives essentially zero probability of such exceptional jumps.

The next section presents the Noisy Markov Chain Monte Carlo Algorithm and Noisy Simulated Annealing Algorithm and demonstrates the MCMC noise benefit in three simulations. The first simulation shows that noise reduces the convergence time in Metropolis-Hastings optimization of the highly nonlinear Schwefel function (FIG. 1) by 75%.

FIG. 1 illustrates Schwefel function in 2 dimensions: The Schwefel function $f(x) = 419.9829d - \Sigma_{i=1}^{d} x_i \sin(\sqrt{|x|})$ is a d-dimensional optimization benchmark on the hypercube $-512 \leq x_i \leq 512$ [Hans-Paul Schwefel. Numerical Optimization of Computer Models. John Wiley & Sons, Inc., New York, N.Y., USA, 1981], [Darrell Whitley, Soraya Ranaa, John Dzubera, and Keith E Mathias. Artificial Intelligence Evaluating evolutionary algorithms. *Artificial Intelligence*, 85(1-2):245-276, 1996], [Johannes M. Dieterich. Empirical Review of Standard Benchmark Functions Using Evolutionary Global Optimization. *Applied Mathematics*, 03(October):1552-1564, 2012]. It has a single global minimum $f(x_{min})=0$ at $x_{min}=(420.9687,K,420.9687)$. Energy peaks separate irregular troughs on the surface. This leads to estimate capture in search algorithms that emphasize local search.

Figure 2A:
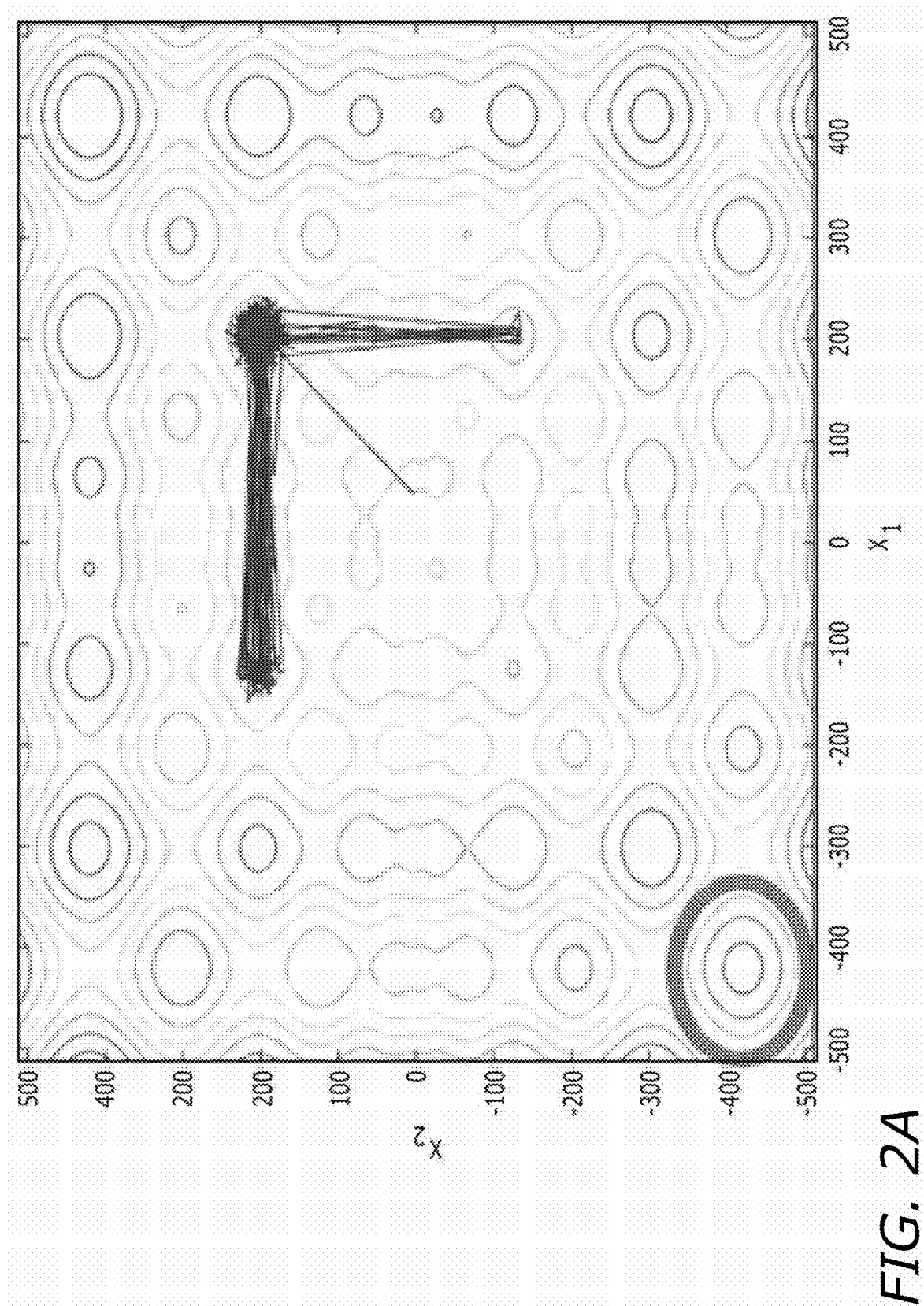
FIGS. 2A and 2B illustrate how noise increases the breadth of search in simulated annealing sample sequences from a 5-dimensional Schwefel function (projected to 2-D) with a logarithmic cooling schedule.
Figure 2B:
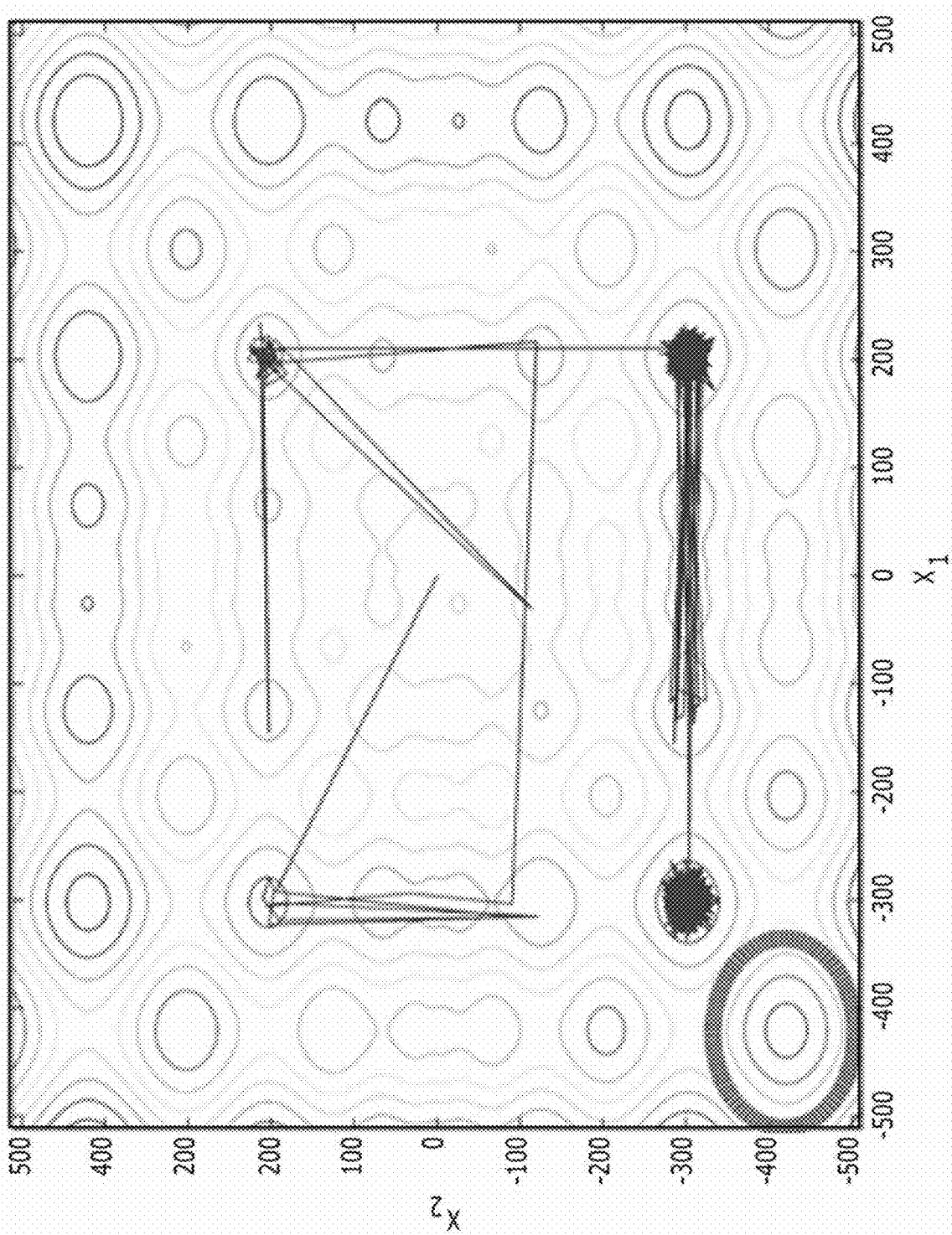

FIGS. 2A and 2B show two sample paths and describes the origin of the convergence noise benefit. Then, noise benefits are shown in an 8-argon-atom molecular-dynamics simulation that uses a Lennard-Jones 12-6 interatomic potential and a Gaussian-jump model.

FIGS. 2A and 2B illustrate how noise increases the breadth of search in simulated annealing sample sequences from a 5-dimensional Schwefel function (projected to 2-D) with a logarithmic cooling schedule. FIG. 2A illustrate the search without noise; while FIG. 2B illustrates the search with noise. Noisy simulated annealing visited more local minima than did noiseless SA and quickly moved from the minima that trapped noiseless SA. Both figures show sample sequences with initial condition $x_0=(0,0)$ and $N=10^6$. The lower left circle indicates the global minimum at $x_{min}=(-420.9687,-420.9687)$. The noiseless algorithm FIG. 2A found the (205,205) local minima within the first 100 time steps. Thermal noise was not enough to induce the noiseless algorithm to search the space beyond three local minima. The noisy simulation in FIG. 2B followed the noiseless simulation at the simulation start. It sampled the same regions, but with noise enhanced thermal jumps. This allowed the simulation to increase its breadth. It visited the same three minima as in FIG. 2A but it performed a local optimization for only a few hundred steps before jumping to the next minimum. The estimate settled at (−310,−310). This was just one hop away from the global minimum $x_{min}$.

Figure 8:
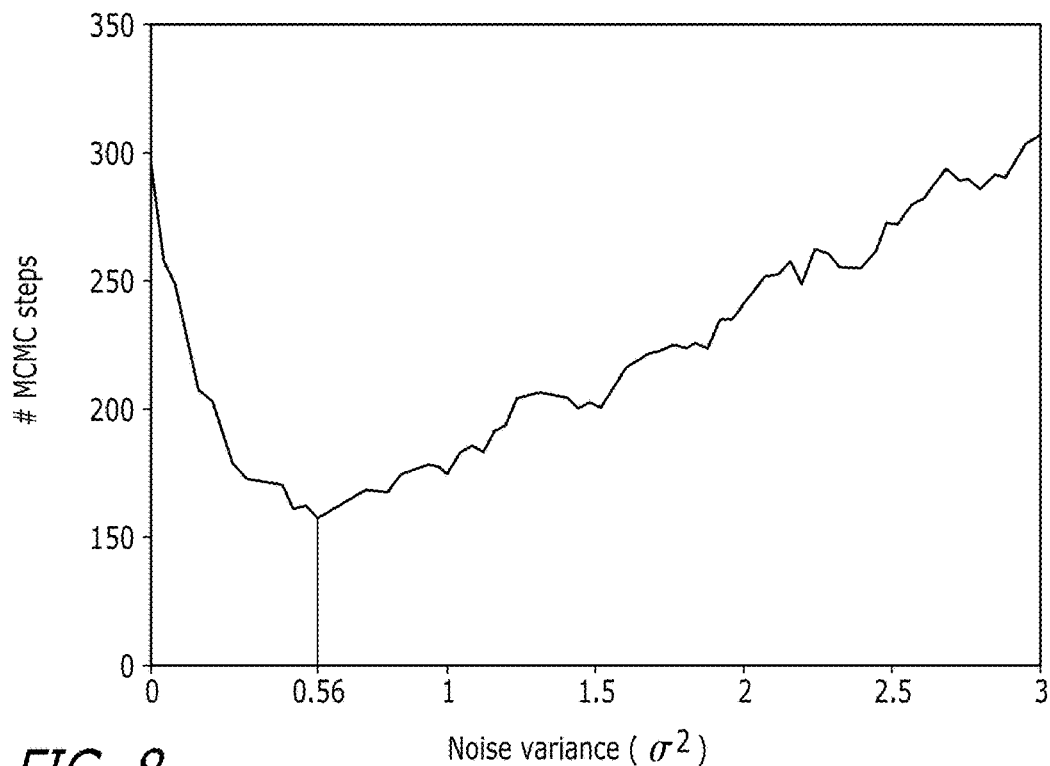
FIG. 8 shows that noise injection produces a 42% reduction in convergence time over the noiseless simulation.

FIG. 8 shows that the optimal noise gives a 42% speed-up: It took 173 steps to reach equilibrium with N-MCMC compared with 300 steps in the noiseless case. The third simulation shows that noise-boosted path-integral Monte Carlo quantum annealing improved the estimated ground state of a 1024-spin Ising spin glass system by 25.6%. The decrease in convergence time was not able to be quantified because the noiseless quantum-annealing algorithm did not converge to a ground state this low in any trial.

Figure 3:
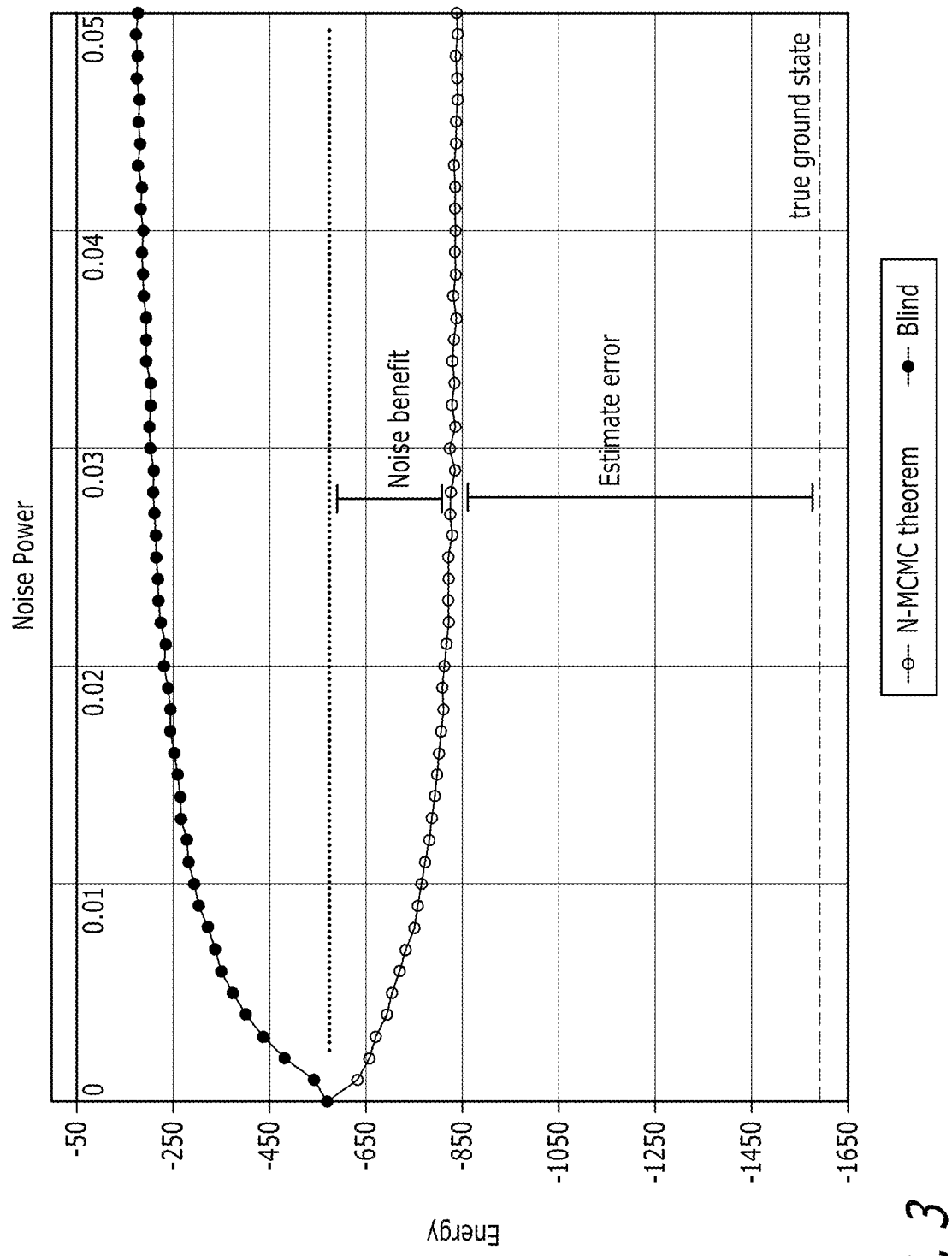
FIG. 3 illustrates an example of simulated quantum-annealing noise benefit in a 1024 Ising-spin simulation.

FIG. 3 illustrates an example of simulated quantum-annealing noise benefit in a 1024 Ising-spin simulation. The lower line shows that noise improved the estimated ground-state energy of a 32×32 spin lattice by 25.6%. This plot shows the ground state energy after 100 path-integral Monte Carlo steps. The true ground state energy (dashed) was $E_0=-1591.92$. Each point is the average calculated ground state from 100 simulations at each noise power. The upper line shows that blind (independent and identically distributed sampling) noise does not benefit the simulation. So the N-MCMC noise-benefit condition is central to the S-QA noise benefit.

Markov Chain Monte Carlo

The Markov chains that underlie the MCMC algorithm are reviewed first [Christian P Robert and George Casella. *Monte Carlo statistical methods* (*Springer Texts in Statistics*). Springer-Verlag, 2nd edition, 2005]. This includes the important MCMC special case called the Metropolis-Hastings algorithm.

A Markov chain is a memoryless random process whose transitions from one state to another obey the Markov property $$P(X_{t+1}=x|X_1=x_1,K,X_t=x_t)=P(X_{t+1}=x|X_t=x_t). \quad (0)$$

P is the single-step transition probability matrix where $$P_{i,j}=P(X_{t+1}=j|x_t=i) \quad (0)$$

is the probability that if the chain is in state i at time t then it will move to state j at time t+1.

State j is accessible from state i if and only if there is a non-zero probability that the chain will transition from state i to state j (i→j) in a finite number of steps $$P_{i,j}^{(n)}>0 \quad (0)$$

for some n>0. A Markov chain is irreducible if and only if each state is accessible from every other state [Christian P Robert and George Casella. *Monte Carlo statistical methods* (*Springer Texts in Statistics*). Springer-Verlag, 2nd edition, 2005], [Sean Meyn and Richard L. Tweedie. *Markov Chains and Stochastic Stability*. Cambridge University Press, 2nd edition, 2009]. Irreducibility implies that for all states i and j there exists m>0 such that $P(X_{n+m}=j|X_n=i)=P_{i,j}^{(m)}>0$. This holds if and only if P is a regular stochastic matrix.

The period $d_i$ of state i is $d_i=\gcd\{n\geq 1:P_{i,j}^{(n)}>0\}$ or $d_i=\infty$ if $P_{i,j}^{(n)}=0$ for all $n\geq 1$ where gcd denotes the greatest common divisor. State i is aperiodic if $d_i=1$. A Markov chain with transition matrix P is aperiodic if and only if $d_i=1$ for all states i.

A sufficient condition for a Markov chain to have a unique stationary distribution π is that all the state transitions satisfy detailed balance: $P[j\to k]x^\infty_j = P[k\to j]x^\infty_k$ for all states j and k. This can also be written as $Q(k|j)\pi(j)=Q(j|k)\pi(k)$. Detailed balance is the reversibility condition of a Markov chain. A Markov chain is reversible if and only if it satisfies the reversibility condition.

Markov Chain Monte Carlo algorithms exploit the Markov convergence guarantee in constructing Markov chains with samples drawn from complicated probability densities. But MCMC methods suffer from problem-specific parameters that govern sample acceptance and convergence assessment [Yun Ju Sung and Charles J. Geyer. Monte Carlo likelihood inference for missing data models. *The Annals of Statistics*, 35(3):990-1011, 2007], [W. R. Gilks, Walter R. Gilks, Sylvia Richardson, and D. J. Spiegelhalter. *Markov chain Monte Carlo in practice*. CRC Press, 1996]. Strong dependence on initial conditions also biases MCMC sampling unless the simulation has a lengthy burn-in period during which the driving Markov chain mixes adequately.

Figure 4A:
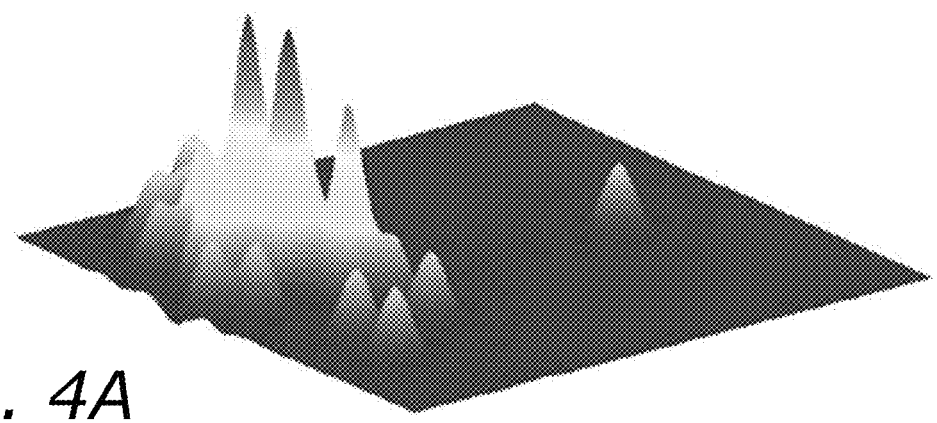
FIGS. 4A, 4B, and 4C illustrate illustrate an example of three panels that show evolution of the 2-dimensional histogram of MCMC samples from the 2-D Schwefel function (FIG. 1).
Figure 4B:
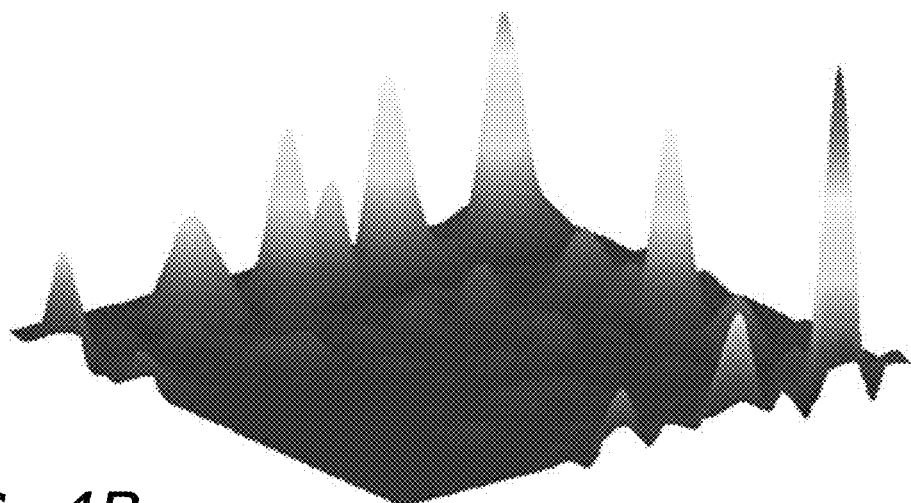
Figure 4C:
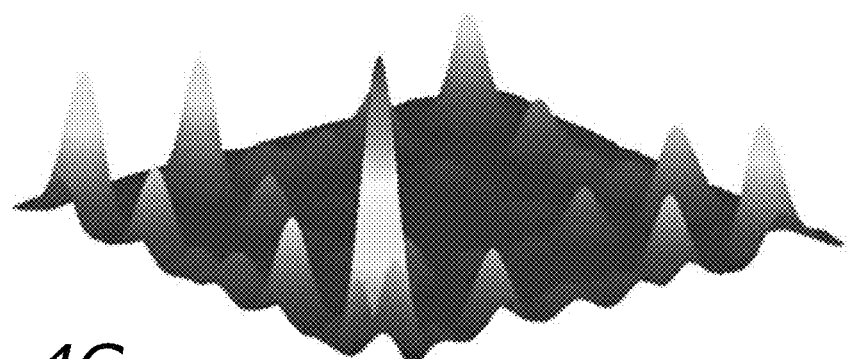

FIGS. 4A, 4B, and 4C illustrate an example of three panels that show evolution of the 2-dimensional histogram of MCMC samples from the 2-D Schwefel function (FIG. 1).

FIG. 4A illustrates a 1000-sample histogram that explores only a small region of the space. The simulation has not sufficiently burned in. The samples remained close to the initial state because the MCMC random walk proposed new samples near the current state. This early histogram does not match the Schwefel density.

FIG. 4B illustrates a 10,000-sample histogram that matches the target density, but there were still large unexplored regions. FIG. 4C illustrates a 100,000-sample histogram, which shows that the simulation explored most of the search space. The tallest peak shows that the simulation found the global minimum. Note that the histogram peaks corresponded to energy minima on the Schwefel surface.

Next presented is Hastings' [W. K. Hastings. Monte Carlo sampling methods using Markov chains and their applications. *Biometrika*, 57:97-109, 1970] generalization of the MCMC Metropolis algorithm now called Metropolis-Hastings. This starts with the classical Metropolis algorithm [N. Metropolis, A. W. Rosenbluth, M. N. Rosenbluth, A. H. Teller, and E. Teller. Equations of state calculations by fast computing machines. *Journal of Chemical Physics*, 21:1087-1091, 1953].

Suppose one wants to sample $x_1, K, x_n$ from a random variable X with probability density function (pdf) p(x). Suppose $$p(x) = \frac{f(x)}{K}$$

for some function $f(x)$ and normalizing constant K. The normalizing constant K may not be known or it may be hard to compute. The Metropolis algorithm constructs a Markov chain that has the target density $\pi$ as its equilibrium density. The algorithm generates a sequence of random-sample realizations from p(x) as follows:

1. Choose an initial $x_0$ with $f(x_0) > 0$.
2. Generate a candidate $x_{t+1}^*$ by sampling from the jump distribution $Q(y|x_t)$. The jump pdf must be symmetric: $Q(y|x_t) = Q(x_t|y)$.
3. Calculate the density ratio $\alpha$ for $x_{t+1}^*$:

$$\alpha = \frac{p(x_{t+1}^*)}{p(x_t)} = \frac{f(x_{t+1}^*)}{f(x_t)}.$$

So the normalizing constant K cancels.

4. Accept the candidate point $x_{t+1} = x_{t+1}^*$ if the jump increases the probability and thus if $\alpha > 1$. But also accept the candidate point with probability $\alpha$ if the jump decreases the probability. Else reject the jump ($x_{t+1} = x_t$) and return to step 2.

A key step is that the Metropolis algorithm sometimes accepts a new state that lowers the probability. But it does so only with some probability $\alpha < 1$. This implies in optimization that the random search algorithm sometimes picks a new state-space point that increases the cost function. So the Metropolis algorithm is not a simple "greedy" algorithm that always picks the smallest value and never backtracks. Picking the occasional larger-cost state acts as a type of random error correction. It can help the state bounce out of local cost minima and bounce into deeper-cost minima. This jump property is exploited below by using alpha-stable jump pdfs that have thicker power-law tails than the Gaussian's thinner exponential tails.

Hastings' [W. K. Hastings. Monte Carlo sampling methods using Markov chains and their applications. *Biometrika*, 57:97-109, 1970] replaced the symmetry constraint on the jump distribution Q with a slightly more general a term:

$$\alpha = \min\left(\frac{f(x_{t+1}^*)Q(x_t | x_{t+1}^*)}{f(x_t)Q(x_{t+1}^* | x_t)}, 1\right).$$

A simple calculation shows that detailed balance still holds [Christian P Robert and George Casella. *Monte Carlo statistical methods (Springer Texts in Statistics)*. Springer-Verlag, 2nd edition, 2005]. The resulting MCMC algorithm is the Metropolis-Hastings algorithm. Gibbs sampling is a special case of the Metropolis-Hastings algorithm when $\alpha = 1$ always holds for each conditional pdf [Christian P Robert and George Casella. *Monte Carlo statistical methods (Springer Texts in Statistics)*. Springer-Verlag, 2nd edition, 2005], [Steve Brooks, Andrew Gelman, Galin Jones, and Xiao-Li Meng. *Handbook of Markov Chain Monte Carlo*. CRC press, 2011]. Gibbs sampling uses a divide-and-conquer strategy to estimate a joint n-dimensional pdf $p(x_1, K, x_n)$. It cycles through n 1-dimensional conditional pdfs of the form $p(x_2|x_1, x_3, x_4, K, x_n)$ at each sampling epoch.

Simulated Annealing

Simulated annealing is a time-varying version of the Metropolis-Hastings algorithm for global optimization. Kirkpatrick [Scott Kirkpatrick, Mario P. Vecchi, and C. D. Gelatt. Optimization by simulated annealing. *Science*, 220 (4598):671-680, 1983] first introduced this thermodynamically inspired algorithm as a method to find optimal or near-optimal layouts for VLSI circuits.

Suppose one wants to find the global minimum of a cost function C(x). Simulated annealing maps the cost function to a potential energy surface through the Boltzmann factor $$\overset{\circ}{p}(x_t) \propto \exp\left[\frac{C(x_t)}{kT}\right] \tag{0}$$

and then runs the Metropolis-Hastings algorithm with $\overset{\circ}{p}(x_t)$ in place of the pdf p(x). This operation preserves the Metropolis-Hastings framework because $\overset{\circ}{p}(x_t)$ is an unnormalized pdf.

Simulated annealing uses a temperature parameter T to tune the Metropolis-Hastings acceptance probability $\alpha$. The algorithm slowly cools the system according to a cooling schedule T(t) in analogy to metallurgical annealing of a substance to a low-energy crystalline configuration. This reduces the probability of accepting candidate points with higher energy. The algorithm provably attains a global minimum in the limit but this requires an extremely slow log(t+1) cooling [S. Geman and D. Geman. Stochastic relaxation, Gibbs distributions, and the Bayesian restoration of images. *IEEE Transactions on Pattern Analysis and Machine Intelligence*, PAMI-6:721-741, 1984]. Accelerated cooling schedules such as geometric or exponential often yield satisfactory approximations in practice. The procedure below describes the simulated-annealing algorithm. The algorithm attains the global minimum as $t \to \infty$:

1. Choose an initial $x_0$ with $C(x_0) > 0$ and initial temperature $T_0$.
2. Generate a candidate $x_{t+1}^*$ by sampling from the jump distribution $Q(y|x_t)$.
3. Compute the Boltzmann factor $$\alpha = \exp\left(\frac{C(x_{t+1}^*) - C(x_t)}{kT}\right).$$

4. Accept the candidate point (thus $x_{t+1} = x_{t+1}^*$) if the jump decreases the energy. Also accept the candidate point with probability $\alpha$ if the jump increases the energy. Else reject the jump and thus $x_{t+1} = x_t$.
5. Update the temperature $T_t = T(t)$. T(t) is usually a monotonic decreasing function.
6. Return to step 2.

The next two sections show how to noise-boost MCMC and simulated annealing algorithms.

Noisy Markov Chain Monte Carlo

Theorem 1 next shows how carefully injected noise can speed the average convergence of MCMC simulations by reducing the relative-entropy (Kullback-Liebler divergence) pseudo-distance.

Theorem 1 states the Noisy MCMC (N-MCMC) Theorem. It gives a simple inequality as a sufficient condition for the speed-up. The Appendix below gives the proof along with the proofs of all other theorems and corollaries. An algorithm statement follows Theorem 2. Reversing inequalities in the N-MCMC Theorem leads to noise that on average slows convergence. This noise slow-down result parallels the related reversal of the inequality in the NEM Theorem mentioned above [Kartik Audhkhasi, Osonde Osoba, and Bart Kosko. Noise-enhanced convolutional neural networks. *Neural Networks*, 78:15-23, 2016], [Osonde Osoba and Bart Kosko. The noisy expectation-maximization algorithm for multiplicative noise injection. *Fluctuation and Noise Letters*, page 1650007, 2016].

Corollary 1 weakens the N-MCMC sufficient condition by way of a new exponential term. Corollary 2 generalizes the jump structure in Corollary 1. FIG. 8 shows simulation instances of Corollary 2 for a Lennard-Jones model of the interatomic potential of an eight argon atom gas. The graph shows the optimal Gaussian variance for the quickest convergence to the global minimum of the potential energy. Corollary 3 shows that a Gaussian jump function reduces the sufficient condition to a simple quadratic inequality. Corollary 4 generalizes Corollary 3.

Corollary 5 states a similar quadratic inequality when the jump function is the thicker-tailed Cauchy probability bell curve. Earlier simulations showed without proof that a Cauchy jump function can lead to "fast" simulated annealing because sampling from its thicker tails can lead to more frequent long jumps out of shallow local minima [Harold Szu and Ralph Hartley. Fast simulated annealing. *Physics letters A*, 122(3):157-162, 1987]. Corollary 5 proves that this speed-up will occur in MCMC simulations if the N-MCMC condition holds and suggests a general proof strategy for using other closed-form symmetric alpha-stable jump densities [K. A. Penson and K. Górska. Exact and explicit probability densities for one-sided Lévy stable distributions. *Phys. Rev. Lett.*, 105(21):210604, November 2010], [J. P. Nolan. *Stable Distributions—Models for Heavy Tailed Data*. Birkhauser, Boston, 2011], [K. Górska and K. A. Penson. Lévy stable distributions via associated integral transform. *Journal of Mathematical Physics*, 53(5):053302, 2012].

The N-MCMC Theorem and its corollaries are now stated.

Theorm 1 (Noisy Markov Chain Monte Carlo Theorem (N-MCMC))

Suppose that $Q(x|x_t)$ is a Metropolis-Hastings jump pdf for time t and that satisfies detailed balance $\pi(x_t)Q(x|x_t)=\pi(x)Q(x_t|x)$ for the target equilibrium pdf $\pi(x)$. Then the MCMC noise benefit $d_t(N) \geq d$ occurs on average if $$E_{N,x}\left[\ln\frac{Q(x|x_t+N)}{Q(x|x_t)}\right] \geq E_N\left[\ln\frac{\pi(x_t+N)}{\pi(x_t)}\right] \quad (0)$$

where $d_t=D(\pi(x)PQ(x_t|x))$, $d_t(N)=D(\pi(x)PQ(x_t+N|x))$, $N:f_{N|x_t}(n|x_t)$ is noise that may depend on $x_t$, and $D(\cdot P\cdot)$ is the relative-entropy pseudo-distance:

$$D(PPQ) = \int_X p(x)\ln\left(\frac{p(x)}{q(x)}\right)dx. \quad (0)$$

Corollary 1
The N-MCMC noise benefit condition holds if $$Q(x|x_t+n) \geq e^A Q(x|x_t) \quad (0)$$

for almost all x and n where $$A = E_N\left[\ln\frac{\pi(x_t+N)}{\pi(x_t)}\right]. \quad (0)$$

Corollary 2
The N-MCMC noise benefit condition holds if $$Q(x|g(x_t,n)) \geq e^A Q(x|x_t) \quad (0)$$

for almost all x and n where $$A = E_N\left[\ln\frac{\pi(g(x_t,N))}{\pi(x_t)}\right]. \quad (0)$$

Corollary 3
Suppose $Q(x|x_t):N(x_t,\sigma^2)$:

$$Q(x|x_t) = \frac{1}{\sigma\sqrt{2\pi}}e^{-\frac{(x-x_t)^2}{2\sigma^2}}. \quad (0)$$

Then the sufficient noise benefit condition ((0)) holds if
$$n(n-2(x_t-x)) \leq -2\sigma^2 A. \quad (0)$$

Corollary 4
Suppose $Q(x|x_t):N(x_t,\sigma^2)$ and $g(x_t,n)=nx_t$. Then the sufficient noise benefit condition ((0)) holds if
$$nx_t(2x-nx_t)-x_t(2x-x_t) \leq -2\sigma^2 A. \quad (0)$$

Corollary 5
Suppose $Q(x|x_t)$: Cauchy (m,d):

$$Q(x|x_t) = \frac{1}{\pi d\left[1+\left(\frac{x-m}{d}\right)^2\right]}. \quad (0)$$

Then the sufficient condition (0) holds if
$$n^2+2n(x-x_t) \leq (e^{-A}-1)(d^2+(x-x_t)^2). \quad (0)$$

Noisy Simulated Annealing

Next shown is how to noise-boost simulated annealing. Theorem 2 states the Noisy Simulated Annealing (N-SA) Theorem and gives a simple inequality as a sufficient condition for the speed-up. The Appendix below gives the proof based on Jensen's inequality for convex functions. An algorithm statement follows the statement of Theorem 2.

Theorem 2 (Noisy Simulated Annealing Theorem (N-SA))

Suppose C(x) is an energy surface with occupancy probabilities given by $$\pi(x;T) \propto \exp\left(-\frac{C(x)}{T}\right).$$

Then the simulated-annealing noise-benefit
$$E_N[\alpha_N(T)] \geq \alpha(T) \quad (0)$$
occurs on average if $$E_N\left[\ln\frac{\pi(x_t+N;T)}{\pi(x_t;T)}\right] \geq 0 \quad (0)$$

where $\alpha(T)$ is the simulated annealing acceptance probability from state $x_t$ to the candidate $x_{t+1}^*$ that depends on a temperature T (governed by the cooling schedule T(t)):

$$\alpha(T) = \min\left\{1, \exp\left(-\frac{\Delta E}{T}\right)\right\} \qquad (0)$$

and $\Delta E = E_{t+1}^* - E_t = C(x_{t+1}^*) - C(x_t)$ is energy difference of states $x_{t+1}^*$ and $x_t$.

The next two corollaries extend the N-SA in different directions. Corollary 4 still ensures an annealing speed-up when an increasing convex function applies to the key ratio in the acceptance probability. Corollary 6 ensures such a speed-up when the equilibrium distribution $\pi(x)$ has a Gibbs or continuous soft-max form. The Appendix below gives the proofs.

Corollary 6

Suppose m is an convex increasing function. Then an N-SA Theorem noise benefit $$E_N[\beta_N(T)] \geq \beta(T) \qquad (0)$$

occurs on average if $$E_N\left[\ln\frac{\pi(x_t + N; T)}{\pi(x_t; T)}\right] \geq 0 \qquad (0)$$

where $\beta$ is the acceptance probability from state $x_t$ to the candidate $x_{t+1}^*$:

$$\beta(T) = \min\left\{1, m\left(\frac{\pi(x_{t+1}^*; T)}{\pi(x_t; T)}\right)\right\}. \qquad (0)$$

Corollary 7

Suppose $\pi(x) = Ae^{g(x)}$ where A is normalizing constant or partition function such that $$A = \frac{1}{\int_X e^{g(x)} dx}.$$

Then there is an N-SA Theorem noise benefit if $$E_N[g(x_t + N)] \geq g(x_t) \qquad (0)$$

Noisy MCMC Algorithms and Results

Next presented are algorithms for noisy MCMC and for noisy simulated annealing. Each is followed with simulation applications and results that show improvement over existing noiseless algorithms.

The Noisy MCMC Algorithms

This section introduces two noise-boosted versions of MCMC algorithms. Algorithm 5.1 shows how to inject helpful noise into the Metropolis-Hastings MCMC algorithm for sampling. Algorithm 5.1 shows how to inject noise that improves stochastic optimization with simulated annealing.

---

Algorithm 5.1 The Noisy Metropolis Hastings Algorithm

NoisyMetroplisHastings(X)
   $x_0 \leftarrow$ Initial(X)
   for t $\leftarrow$ 0, N

---

Algorithm 5.1 The Noisy Metropolis Hastings Algorithm $x_{t+1} \leftarrow$ Sample($x_t$)
   procedure Sample($x_t$)
     $x_{t+1}^* \leftarrow x_t +$ JumpQ($x_t$) + Noise($x_t$)
     $\alpha \leftarrow \dfrac{\pi(x_{t+1}^*)}{\pi(x_t)}$
     if a > 1, then
       return $x_{t+1}^*$
     else if Uniform[0, 1] < $\alpha$
       return $x_{t+1}^*$
     else
       return $x_t$
   JumpQ($x_t$)
     return y: Q(y|$x_t$)
   Noise($x_t$)
     return y: f(y|$x_t$)

---

Algorithm 5.2 The Noisy Simulated Annealing Algorithm

NoisySimulatedAnnealing (X,$T_0$)
   $x_0 \leftarrow$ Initial (X)
   for t $\leftarrow$ 0, N
     T $\leftarrow$ Temp(t)
     $x_{t+1} \leftarrow$ Sample($x_t$, T)
   Sample($x_t$, T)
     $x_{t+1}^* \leftarrow x_t +$ JumpQ($x_t$) + Noise($x_t$)
     $\alpha \leftarrow \pi(x_{t+1}^*) - \pi(x_t)$
     if $\alpha \leq 0$
       return $x_{t+1}^*$
     else if Uniform[0,1] < exp(-$\alpha$/T)
       return $x_{t+1}^*$
     else
       return $x_t$
   JumpQ($x_t$)
     return y: Q(y|$x_t$)
   Noise( $x_t$ )
     return y: f (y|$x_t$)

---

Noise Improves Complex Multimodal Optimization

The first simulation shows a noise benefit in simulated annealing on a complex cost function. The Schwefel function [Hans-Paul Schwefel. *Numerical Optimization of Computer Models*. John Wiley & Sons, Inc., New York, N.Y., USA, 1981] is a standard optimization benchmark because it has many local minima and a single global minimum. The Schwefel function ƒ has the form $$f(x) = 419.9829d - \sum_{i=1}^{d} x_i \sin\left(\sqrt{|x_i|}\right) \qquad (0)$$

where d is the dimension over the hypercube $-500 \leq x_i \leq 500$ for i=1,K,d. The Schwefel function has a single global minimum $f(x_{min})=0$ at $x_{min}=(420.9687, K, 420.9687)$. FIG. 1 shows a representation of the surface for d=2.

The simulation used a zero-mean Gaussian jump pdf with $\sigma_{jump}=5$ and zero-mean Gaussian noise pdf with $0<\sigma_{noise}\leq 5$.

Figure 5A:
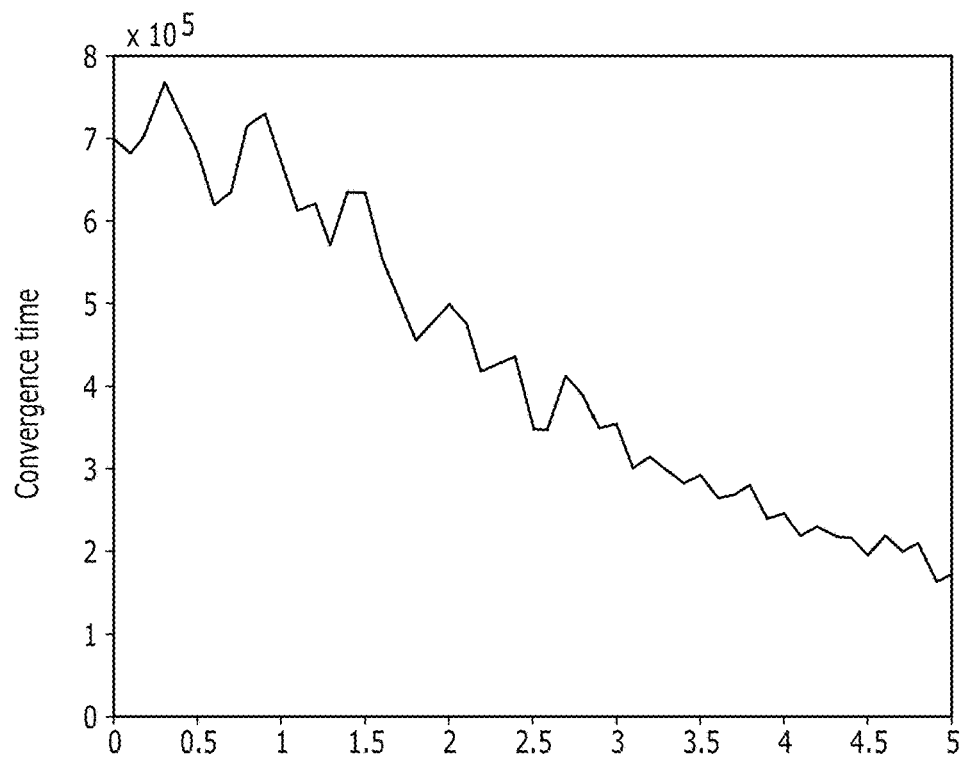
FIGS. 5A, 5B, and 5C illustrate an example of simulated annealing noise benefits with 5-dimension Schwefel energy surface and log cooling schedule.
Figure 5B:
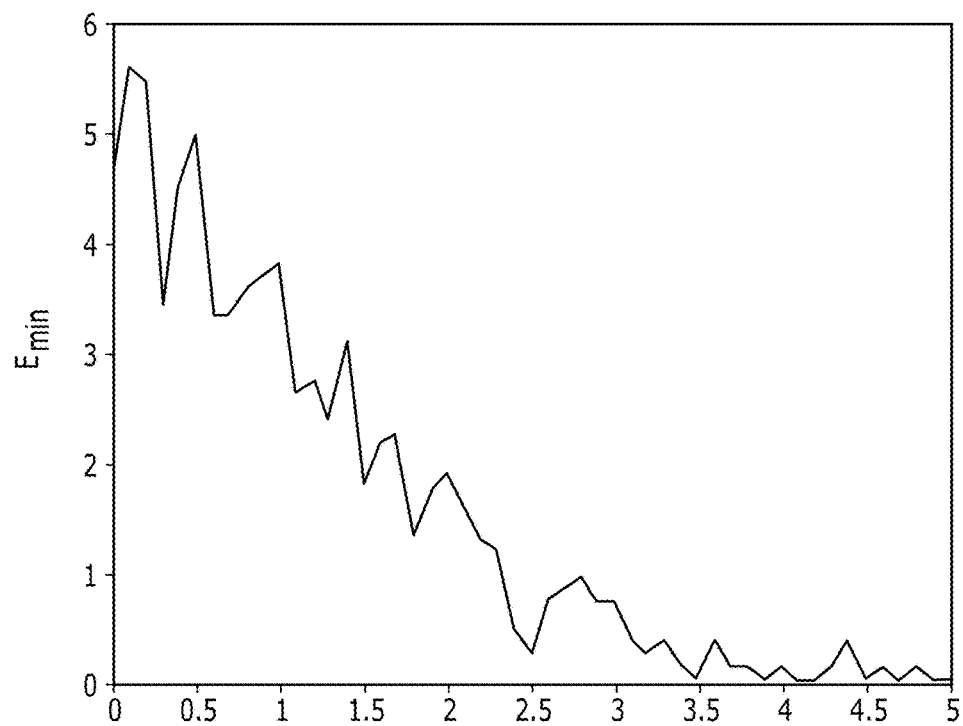
Figure 5C:
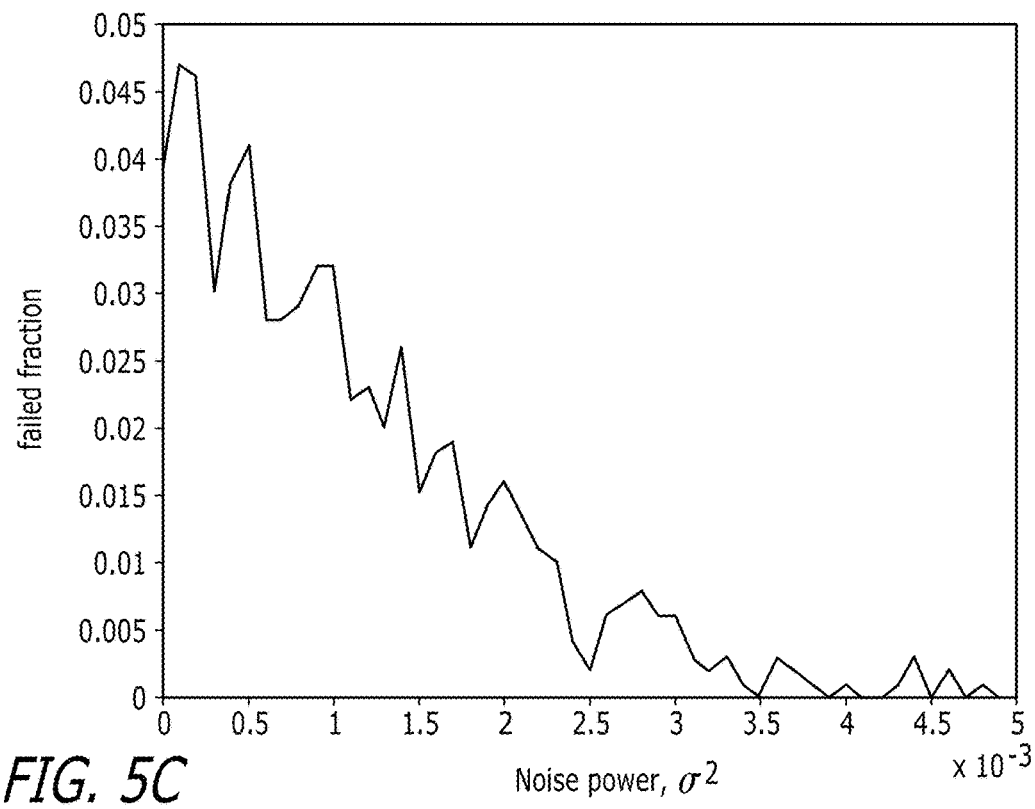

FIGS. 5A-5C illustrate an example of simulated annealing noise benefits with 5-dimension Schwefel energy surface and log cooling schedule. The noise benefited three distinct performance metrics. FIG. 5A illustrates noise reduced convergence time by 76%. Convergence time is defined as the number of steps that the simulation takes to estimate the energy global minimum with error less than $10^{-3}$. Simulations with faster convergence usually found better estimates given the same computational time. FIG. 5B illustrates how noise improved the estimate of the minimum system energy by two orders of magnitude in simulations with a fixed run time ($t_{max}=10^6$). FIGS. 2A and 2B shows how the estimated minimum corresponds to samples. Noise increased the breadth of the search and pushed the simulation to make good jumps toward new minima. FIG. 5C illustrates how noise decreased the likelihood of failure in a given trial by almost 100%. A simulation failure is defined as if it did not converge by $t=10^7$. This was about 20 times longer than the average convergence time. 4.5% of noiseless simulations failed under this definition. Noisy simulated annealing produced only 2 failures in 1000 trials (0.2%).

FIG. 5A shows that noisy simulated annealing converges 76% faster than noiseless simulated annealing when using log-cooling. FIG. 5B shows that the estimated global minimum from noisy simulated annealing is almost two orders of magnitude better than noiseless simulations on average (0.05 versus 4.6).

The simulation annealed a 5-dimensional Schwefel surface. So d=5 in the Schwefel function in ((0)). The simulation estimated the minimum energy configuration and then averaged the result over 1000 trials. We defined the convergence time as the number of steps that the simulation required to reach the global minimum energy within $10^{-3}$:

$$|f(x_t)-f(x_{min})| \leq 10^{-3}. \tag{0}$$

FIG. 2A projects trajectories from a noiseless simulation, while FIG. 2B projects trajectories from a noise-boosted simulation. Each simulation was initialized with the same $x_0$. The figures show the global minimum circled in the lower left. They show that noisy simulated annealing boosted the sequences through more local minima while the noiseless simulation could not escape cycling between three local minima.

FIG. 5C shows that noise lowered the failure rate of the simulation. A failed simulation is defined as a simulation that did not converge before $t<10^7$. The failure rate was 4.5% for noiseless simulations. Even moderate injected noise brought the failure rate to less than 1 in 200 (<0.5%).

Figure 6A:
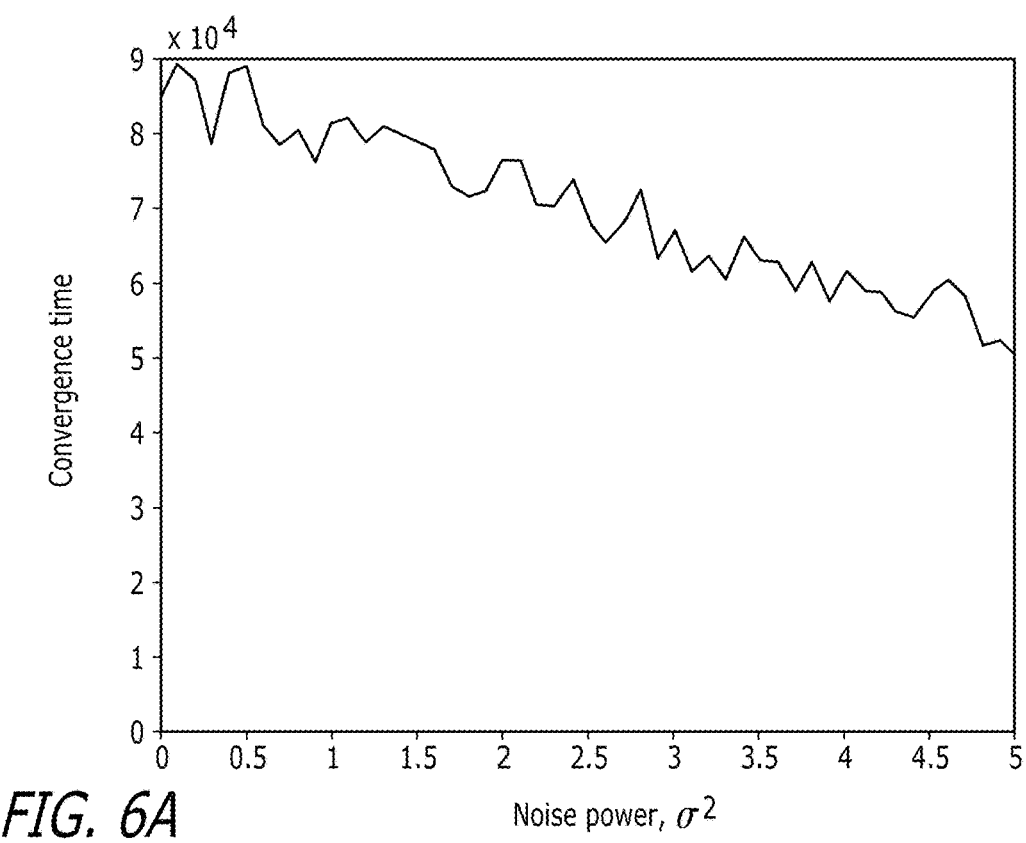
FIGS. 6A and 6B illustrate how noise benefits decrease convergence time under accelerated cooling schedules.
Figure 6B:
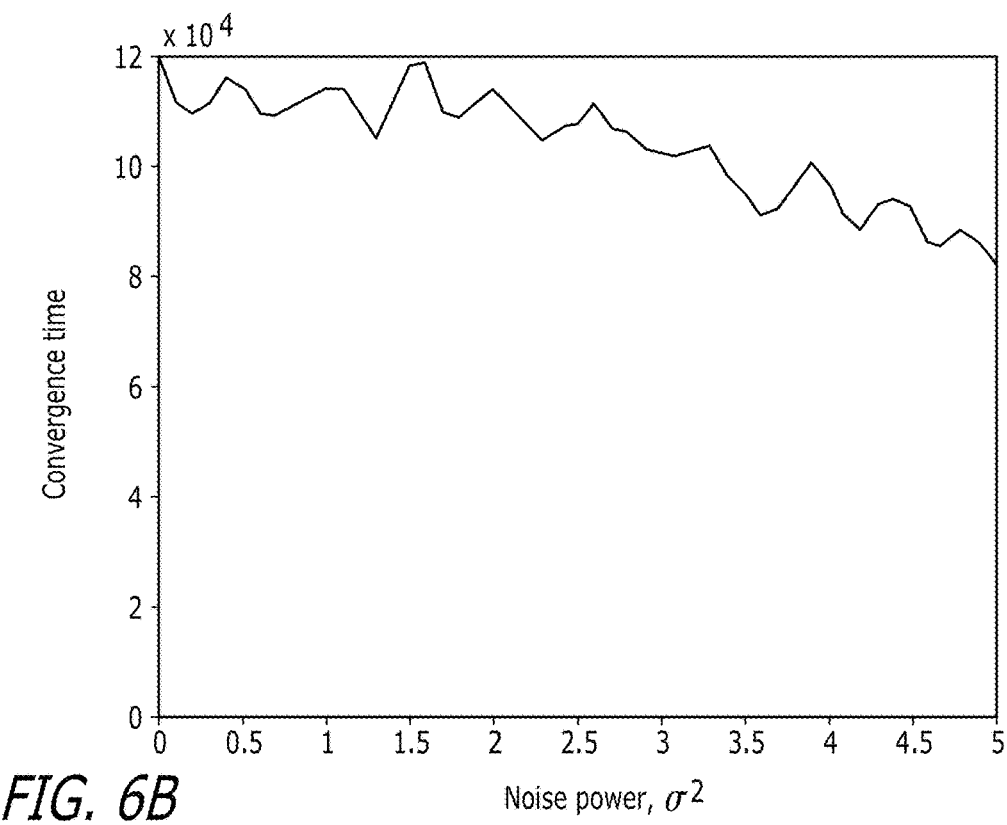

FIGS. 6A and 6B illustrate how noise decreased convergence time under accelerated cooling schedules. Simulated annealing algorithms often use an accelerated cooling schedule such as exponential cooling $T_{exp}(t)=T_0 \cdot A^t$ or geometric cooling $T_{geom}(t)=T_0 \cdot \exp(-At^{1/d})$ where A<1 and $T_0$ are user parameters and d is the sample dimension. Accelerated cooling schedules do not have convergence guarantees like log cooling $T_{log}(t)=\log(t+1)$ but often give better estimates given a fixed run time. Noise-enhanced simulated annealing reduced convergence time under an (a) exponential cooling schedule as shown in FIG. 6A by 40.5% and under a (b) geometric cooling schedule as shown in FIG. 6B by 32.8%. The simulations had comparable solution error and failure rates (0.05%) across all noise levels. Noise speeds Lennard-Jones 12-6 simulations Next is shown how noise can speed up simulations of an MCMC molecular dynamics model. The noise-boosted Metropolis-Hastings algorithm (Algorithm 2) searched a 24-dimensional energy landscape. It used the Lennard-Jones 12-6 potential well to model the pairwise interactions between an 8-argon atom gas.

Figure 7:
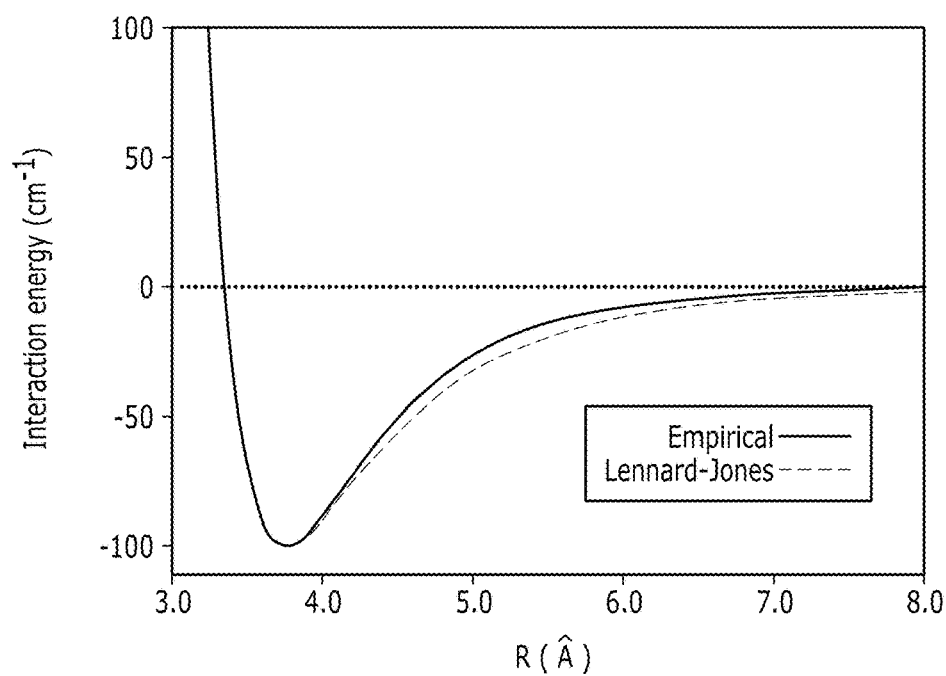
FIG. 7 shows how the two terms in equation (28) below interact to form the energy surface.

The Lennard-Jones 12-6 potential well approximated pairwise interactions between two neutral atoms. FIG. 7 shows the energy of a two-atom system as a function of the interatomic distance. The well is the result of two competing atomic effects: (1) overlapping electron orbitals cause strong Pauli repulsion to push the atoms apart at short distances and (2) van der Waals and dispersion attractions pull the atoms together at longer distances. Three parameters characterize the potential: (1) ε is the depth of the potential well, (2) $r_m$ is the interatomic distance corresponding to the minimum energy, and (3) σ is the zero potential interatomic distance. Table 1 lists parameter values for argon:

TABLE 1

| Argon Lennard-Jones 12-6 parameters | |
| --- | --- |
| ε | 1.654 × $10^{-21}$ J |
| σ | 3.404 × $10^{-10}$ m |
| $r_m$ | 3.405 Å |

The Lennard Jones (12-6) potential well approximates the interaction energy between two neutral atoms [John Edward Lennard-Jones. On the determination of molecular fields. i. from the variation of the viscosity of a gas with temperature. *Proceedings of the Royal Society of London A: Mathematical, Physical and Engineering Sciences*, 106(738):441-462, 1924], [John Edward Lennard-Jones. On the determination of molecular fields. ii. from the equation of state of a gas. *Proceedings of the Royal Society of London A: Mathematical, Physical and Engineering Sciences*, 106(738):463-477, 1924], [L. A. Rowley, D. Nicholson, and N. G. Parsonage. Monte Carlo grand canonical ensemble calculation in a gas-liquid transition region for 12-6 argon. *Journal of Computational Physics*, 17(4):401-414, 1975]:

$$V_{LJ} = \varepsilon\left[\left(\frac{r_m}{r}\right)^{12} - 2\left(\frac{r_m}{r}\right)^6\right] \tag{0}$$

$$= 4\varepsilon\left[\left(\frac{\sigma}{r}\right)^{12} - \left(\frac{\sigma}{r}\right)^6\right] \tag{0}$$

where ε is the depth of the potential well, r is the distance between the two atoms, $r_m$ is the interatomic distance that corresponds to the minimum energy, and σ is the zero potential interatomic distance.

FIG. 7 shows how the two terms in ((0)) interact to form the energy surface. The 12-term dominates at short distances because overlapping electron orbitals cause strong Pauli repulsion to push the atoms apart. The 6-term dominates at longer distances because van der Waals and dispersion forces pull the atoms toward a finite equilibrium distance $r_m$. Table 1 lists the value of the Lennard-Jones parameters for argon.

The Lennard-Jones simulation estimated the minimum-energy coordinates for 8 argon atoms in 3 dimensions. 200 trials were performed at each noise level. Each trial is summarized as the average number of steps that the system required to estimate the minimum energy within $10^{-2}$.

FIG. 8 shows that noise injection produces a 42% reduction in convergence time over the noiseless simulation. FIG. 8 shows MCMC noise benefit for an MCMC molecular dynamics simulation. Noise decreased the convergence time for an MCMC simulation to find the energy minimum by 42%. The plot shows the number of steps that an MCMC simulation needed to converge to the minimum energy in a eight-argon-atom gas system. The optimal noise had a standard deviation of 0.64. The plot shows 100 noise levels with standard deviations between 0 (no noise) and σ=3. Each point averaged 200 simulations and shows the average number of MCMC steps required to estimate the minimum to within 0.01. The interaction was modeled between two argon atoms with the Lennard-Jones 12-6 model ε=1.654× $10^{-21}$ J and σ=3.405×$10^{-10}$ m=3.405 Å [L. A. Rowley, D.

Nicholson, and N. G. Parsonage. Monte Carlo grand canonical ensemble calculation in a gas-liquid transition region for 12-6 argon. *Journal of Computational Physics*, 17(4):401-414, 1975].

Quantum Simulated Annealing

An algorithm was developed to noise-boost quantum annealing (QA). The noise-boosted QA algorithm is far more complex than the above noise-injection algorithms for classical MCMC and annealing. It requires a review of the main quantum structure of QA.

QA is a quantum-based search technique that tries to minimize a multimodal cost function defined on several variables. QA uses quantum fluctuations and tunneling to evolve the system state in accord with the quantum Hamiltonian. Classical simulated annealing uses thermodynamic excitation.

Simulated QA uses an MCMC framework to simulate draws from the square amplitude of the wave function $\Psi(r, t)$ This sampling avoids the often insurmountable task of solving the time-dependent Schrödinger wave equation:

$$i\hbar \frac{\partial}{\partial t}\Psi(r, t) = \left[\frac{-\hbar^2}{2\mu}\nabla^2 + V(r, t)\right]\Psi(r, t) \quad (0)$$

where $\mu$ is the particle reduced mass, V is the potential energy, and $\nabla^2$ is the Laplacian differential operator (the divergence of the gradient).

The acceptance probability in classical simulated annealing depends on the ratio of a function of the energy of the old and the new states. This dependence can prevent beneficial hops if energy peaks lie between minima. QA uses probabilistic tunneling to allow occasional jumps through high-energy regions of the cost surface.

QA arose when Ray and Chakrabarti [P. Ray, B. K. Chakrabarti, and Arunava Chakrabarti. Sherrington-kirkpatrick model in a transverse field: Absence of replica symmetry breaking due to quantum fluctuations. *Phys. Rev. B*, 39(16):11828-11832, 1989] recast Kirkpatrick's thermodynamic simulated annealing using quantum fluctuations. The quantum algorithm uses a transverse magnetic field $\Gamma$ in place of temperature T in classical simulated annealing. The strength of the magnetic field governs the transition probability of the system. The adiabatic theorem ensures that the system remains near the ground state during slow changes of the field strength [Edward Farhi, Jeffrey Goldstone, Sam Gutmann, J Laplan, Andrew Lundgren, Daniel Preda, Joshua Lapan, Andrew Lundgren, Daniel Preda, J Laplan, Andrew Lundgren, and Daniel Preda. A Quantum Adiabatic Evolution Algorithm Applied to Random Instances of an NP-Complete Problem. *Science*, 292(5516):472, 2001], [Catherine C McGeoch. Adiabatic quantum computation and quantum annealing: Theory and practice. *Synthesis Lectures on Quantum Computing*, 5(2):1-93, 2014]. The adiabatic temperature decrease of the Hamiltonian H(t) in $$H(t) = \left(1 - \frac{t}{T}\right)H_0 + \frac{t}{T}H_P \quad (0)$$

leads to the minimum energy of the underlying potential energy surface as time t approaches a fixed large value T.

QA can greatly outperform classical simulated annealing when the potential-energy landscape contains many high but thin energy barriers between shallow local minima [P. Ray, B. K. Chakrabarti, and Arunava Chakrabarti. Sherrington-kirkpatrick model in a transverse field: Absence of replica symmetry breaking due to quantum fluctuations. *Phys. Rev. B*, 39(16):11828-11832, 1989], [Vasil S Denchev, Sergio Boixo, Sergei V Isakov, Nan Ding, Ryan Babbush, Vadim Smelyanskiy, John Martinis, and Hartmut Neven. What is the computational value of finite range tunneling? arXiv preprint arXiv:1512.02206, 2015]. QA favors problems in discrete search spaces where the cost surface has vast numbers of local minima. This holds when trying to find the ground state of an Ising spin glass.

Lucas [Andrew Lucas. Ising formulations of many NP-problems. *Frontiers in Physics*, 2 (February):1-15, 2014] recently found Ising versions for Karp's 21 NP-complete problems. The NP-complete problems include standard optimization benchmarks such as graph-partitioning, finding an exact cover, integer weight knapsack packing, graph coloring, and the traveling salesman. NP-complete problems are a special class of decision problem. Their time complexity is super-polynomial (NP-hard) in the input size but they have only polynomial time to verify the solution (NP). D-Wave Systems has made quantum annealers commercially available and shown how adiabatic quantum computers can solve some real-world problems [Troels F. R Â knnow Sergio Boixo, Sergei V. Isakov, Zhihui Wang, David Wecker, Daniel A. Lidar, John M. Martinis, and Matthias Troyer. Evidence for quantum annealing with more than one hundred qubits. *Nature Physics*, 10:218-224, 2014]. Characteristically, the quantum annealer includes superconducting flux qubits with programmable couplings.

Spin glasses are systems with localized magnetic moments [Marc Mézard and Montanari Andrea. *Information Theory, Physics and Computation*. Oxford University Press, 2009]. Quenched disorder characterizes the steady-state interactions between atomic moments. Thermal fluctuations drive moment changes within the system. Ising spin glass models use a 2-D or 3-D lattice of discrete variables to represent the coupled dipole moments of atomic spins. The discrete variables take one of two values: +1 (up) or −1 (down). The 2-D square-lattice Ising model is the simplest nontrivial statistical models that shows a phase transition [Giovanni Gallavotti. *Statistical mechanics*. Springer-Verlag Berlin Heidelberg, 1999].

Simulated QA for an Ising spin glass usually applies the Edwards-Anderson [Samuel Frederick Edwards and Phil W Anderson. Theory of spin glasses. *Journal of Physics F: Metal Physics*, 5(5):965, 1975] model Hamiltonian H with a transverse magnetic field $J^\perp$:

$$H = U + K = -\sum_{<ij>} J_{ij} s_i s_j - J^\perp \sum_i s_i. \quad (0)$$

where $s_i$ and $s_j$ are the Pauli matrices for the ith and jth spin and the notation $<ij>$ denotes the distinct spin pairs. The transverse field $J^\perp$ and classical Hamiltonian $J_{ij}$ have in general a nonzero commutator:

$$[J^\perp, J_{ij}] \neq 0 \quad (0)$$

with commutator operator [A,B]=AB−BA. The path-integral Monte Caro method is a standard QA method [Roman Marto ň ák, Giuseppe Santoro, and Erio Tosatti. Quantum annealing by the path-integral Monte Carlo method: The two-dimensional random Ising model. *Physical Review B*, 66(9):1-8, 2002] that uses the Trotter approximation for non-commuting quantum operators:

$$e^{-\beta(K+U)} \approx e^{-\beta K} e^{-\beta U} \qquad (0)$$

where $[K,U] \neq 0$ and $$\beta = \frac{1}{k_B T}.$$

The Trotter approximation gives an estimate of the partition function Z:

$$Z = Tr(e^{-\beta H}) \qquad (0)$$

$$= Tr\left(\exp\left[-\frac{\beta(K+U)}{P}\right]\right)^P \qquad (0)$$

$$= \sum_{s^1} L \qquad (0)$$

$$\sum_{s^P} \langle s^1 | e^{-\beta(K+U)/P} | s^2 \rangle \times \langle s^2 | e^{-\beta(K+U)/P} | s^3 \rangle \times L \times \langle s^P | e^{-\beta(K+U)/P} | s^1 \rangle$$

$$\approx C^{NP} \sum_{s^1} L \sum_{s^P} e^{-\frac{H_{d+1}}{PT}} \qquad (0)$$

$$= Z_P \qquad (0)$$

where N is the number of lattice sites in the d-dimensional Ising lattice, P is the number of imaginary-time slices called the Trotter number, $$C = \sqrt{\frac{1}{2}\sinh\left(\frac{2\Gamma}{PT}\right)} \text{ and} \qquad (0)$$

$$H_{d+1} = -\sum_{k=1}^{P}\left(\sum_{ij} J_{ij} s_i^k s_j^k + J^\perp \sum_i s_i^k s_i^{k+1}\right). \qquad (0)$$

Figure 9:
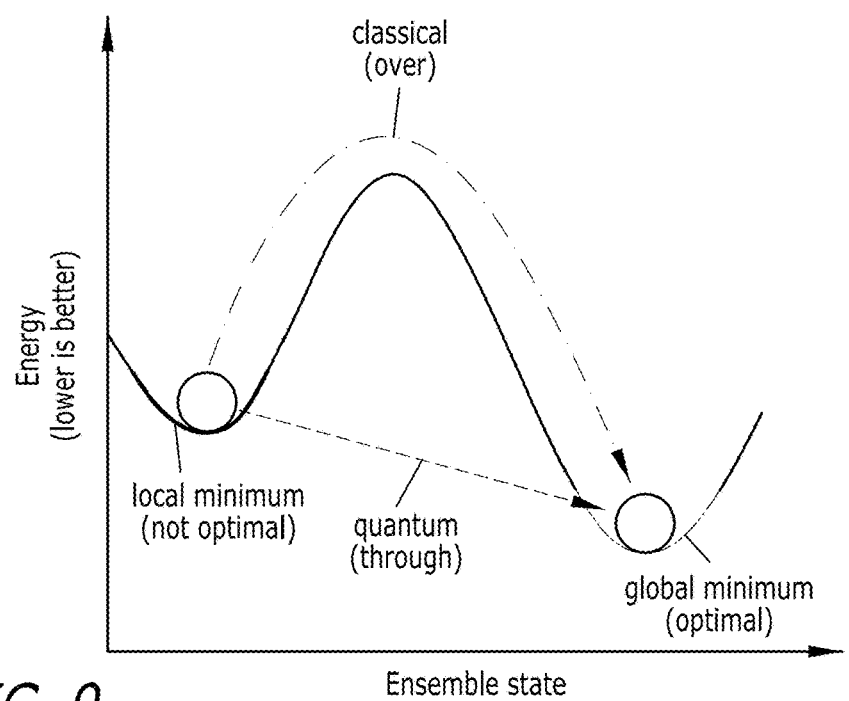
FIG. 9 illustrates quantum annealing (QA) that uses tunneling to go through energy peaks (lower line) instead of over energy peaks (upper line).

FIG. 9 illustrates quantum annealing (QA) that uses tunneling to go through energy peaks (lower line) instead of over energy peaks (upper line). Compare this to classical simulated annealing (SA) that must generate a sequence of states to scale the peak (upper line). This example shows that a local minimum has trapped the state estimate (left) SA will require a sequence of unlikely jumps to scale the potential energy hill. This might be an unrealistic expectation at low SA temperatures. This would trap the estimate in the suboptimal valley forever. QA uses quantum tunneling to escape the local minimum. This illustrates why QA often produces far superior estimates over SA while optimizing complex potential energy surfaces that contain many high energy states.

The product PT determines the spin replica couplings between neighboring Trotter slices and between the spins within slices. Shorter simulations did not show a strong dependence on the number of Trotter slices P [Roman Marto ň ák, Giuseppe Santoro, and Erio Tosatti. Quantum annealing by the path-integral Monte Carlo method: The two-dimensional random Ising model. *Physical Review B*, 66(9): 1-8, 2002]. This is likely because shorter simulations spend relatively less time under the lower transverse magnetic field to induce strong coupling between the slices. So the Trotter slices tend to behave more independently than if they evolved under the increased coupling from longer simulations.

High Trotter numbers (N=40) show substantial improvements for very long simulations. Marto ň ák [Roman Marto ň ák, Giuseppe Santoro, and Erio Tosatti. Quantum annealing by the path-integral Monte Carlo method: The two-dimensional random Ising model. *Physical Review B*, 66(9): 1-8, 2002] compared high-Trotter-number simulations to classical annealing and computed that path-integral QA gave a relative speed-up of four orders of magnitude over classical annealing: "one can calculate using path-integral QA in one day what would be obtained by plain classical annealing in about 30 years."

The Noisy Quantum Simulated Annealing Algorithm

This section develops a noise-boosted version of path-integral simulated QA. Algorithm 3 lists the pseudo-code for the Noisy QA Algorithm.

---

Algorithm 3 The Noisy Quantum Annealing Algorithm

NoisySimulatedQuantumAnnealing(X, $\Gamma_0$, P, T)
   $x_0 \leftarrow$ Initial(X)
   for t $\leftarrow$ 0, N
     $\Gamma \leftarrow$ TransverseField(t)
     $J^\perp \leftarrow$ TrotterScale(P, T, $\Gamma$)
     for all Trotter slices
       for all l spins s
         $x_{t+1}[l, s] \leftarrow$ Sample($x_t$, $J^\perp$, s, l)
TrotterScale(P, T, $\Gamma$)
   return $-\frac{PT}{2}$ logtanh$\left(\frac{\Gamma}{PT}\right)$
Sample ($x_t$, $J^\perp$, s, l)
   E $\leftarrow$ LocalEnergy ($J^\perp$, $x_t$, s, l)
   if E > 0
     return $-x_t$ [l, s]
   else if Uniform[0, 1] < exp (E/T)
     return $-x_t$[l, s]
   else
     if Uniform[0, 1] < NoisePower
       $E^+ \leftarrow$ LocalEnergy($J^\perp$, $x_t$, s, l + 1)
       $E^- \leftarrow$ LocalEnergy($J^\perp$, $x_t$, s, l - 1)
       if E > $E^+$
         $x_{t+1}$[l + 1, s]$\leftarrow$ $-x_t$[l + 1, s]
       if E > $E^-$
         $x_{t+1}$[l - 1, s] $\leftarrow$ $-x_t$[l - 1, s]
     return $x_t$[l, s]

---

Figure 10:
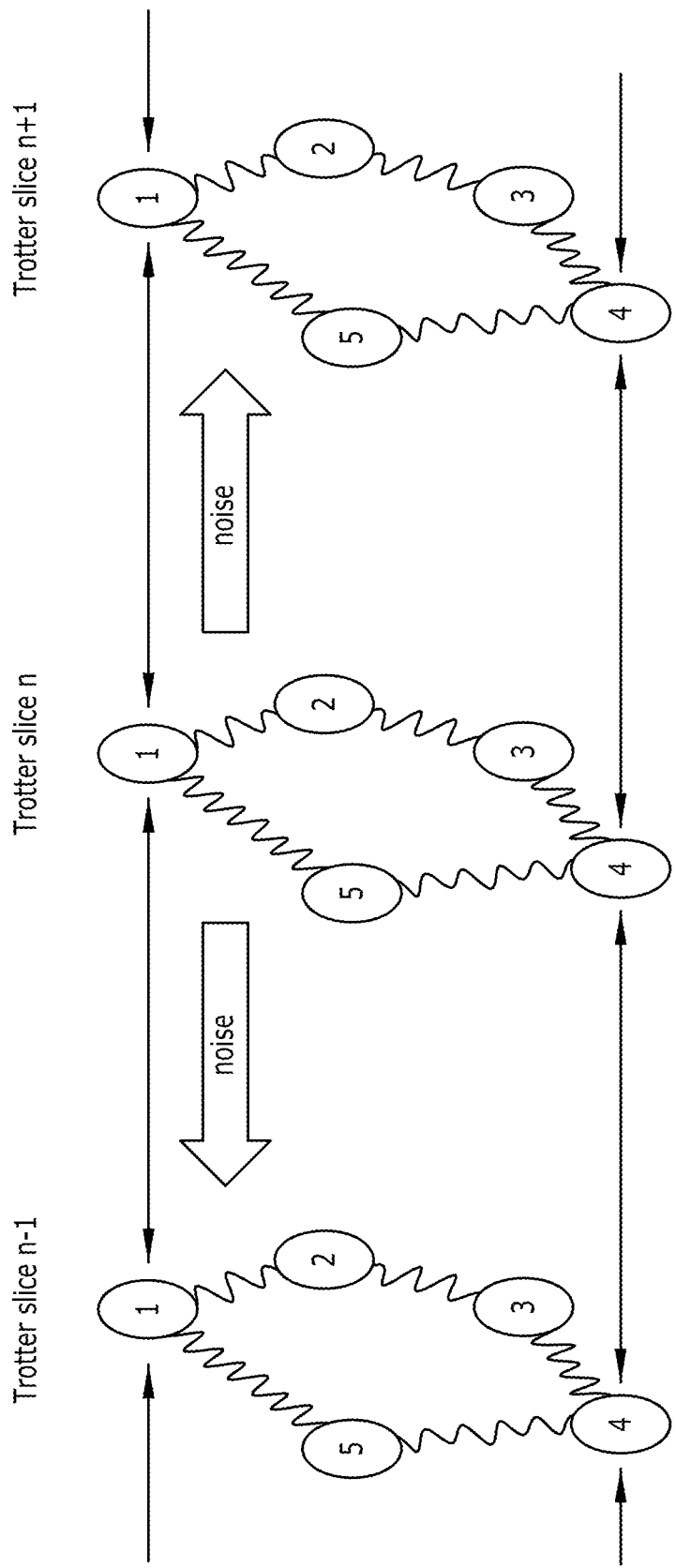
FIG. 10 illustrates how the noisy quantum annealing algorithm propagates noise along the Trotter ring.

FIG. 10 illustrates how the noisy quantum annealing algorithm propagates noise along the Trotter ring. The algorithm inspects the local energy landscape after each time step. It injects noise in the ring by conditionally flipping the spin of neighbors. The spin flips diffuse the noise across the network because quantum correlations between the neighbors encourage convergence to the optimal solution. Noise improves quantum MCMC The third simulation shows a noise benefit in simulated quantum annealing. The simulation shows that noise improves the ground-state energy estimate if the noise obeys a condition similar to that of the N-MCMC theorem.

Path-integral Monte Carlo quantum annealing was used to calculate the ground state of a randomly coupled 1024-bit (32×32) Ising quantum spin system. The simulation used 20 Trotter slices to approximate the quantum coupling at temperature T=0.01. It used 2-D periodic horizontal and vertical boundary conditions (toroidal boundary conditions) with coupling strengths $J_{ij}$ drawn at random from Uniform [−2, 2].

Each trial used random initial spin states ($s_i \in -1, 1$). 100 pre-annealing steps were used to cool the simulation from an initial temperature of $T_0=3$ to $T_q=0.01$. The quantum annealing linearly reduced the transverse magnetic field from $B_0=1.5$ to $B_{final}=10^{-8}$ over 100 steps. A Metropolis-Hastings pass was performed for each lattice across each Trotter slice after each update. $T_q=0.01$ was maintained for the entirety of the quantum annealing. The simulation used the standard slice coupling between Trotter lattices $$J^\perp = \frac{PT}{2} \ln \tanh\left(\frac{B_t}{PT}\right) \qquad (0)$$

where $B_t$ is the current transverse field strength, P is the number of Trotter slices, and T=0.01.

The simulation injected noise into the model using a power parameter p such that 0<p<1. The algorithm extended the Metropolis-Hastings test to each lattice site. It conditionally flipped the corresponding site on the coupled Trotter slices.

The results were benchmarked against the true ground state $E_0=-1591.92$ [University of Cologne. Spin glass server]. FIG. 3 shows that noise that obeys the N-MCMC benefit condition improved the ground-state solution by 25.6%. This injected noise reduced simulation time by many orders of magnitude because the estimated ground state largely converged by the end of the simulation. The decrease in convergence time could not be quantified because the noiseless QA algorithm did not converge near the noisy QA estimate during any trial.

FIG. 3 also shows that the noise benefit was not a simple diffusive benefit. Each trial computed the result of using blind noise. Noise that was the same as the above noise except that the noise did not satisfy the N-MCMC condition. FIG. 3 shows that such blind noise reduced the accuracy of the ground-state estimate by 41.6%.

CONCLUSION

It has been shown that noise can speed MCMC convergence in reversible Markov chains that are aperiodic and irreducible. This noise-boosting of the Metropolis-Hastings algorithm does not require symmetric jump densities. The proofs that the noise boost holds for Gaussian and Cauchy jump densities suggest that the more general family of symmetric stable thick-tailed bell-curve densities [V M Zolotarev. *One-dimensional stable distributions*, volume 65. American Mathematical Soc., 1986], [Chrysostomos L Nikias and Min Shao. *Signal processing with alpha-stable distributions and applications*. Wiley-Interscience, 1995], [K. A. Penson and K. Górska. Exact and explicit probability densities for one-sided Lévy stable distributions. *Phys. Rev. Lett.*, 105(21):210604, November 2010], [J. P. Nolan. *Stable Distributions—Models for Heavy Tailed Data*. Birkhauser, Boston, 2011], [K. Górska and K. A. Penson. Lévy stable distributions via associated integral transform. *Journal of Mathematical Physics*, 53(5):053302, 2012] should also produce noise-boosted MCMC with varying levels of jump impulsiveness.

The noise-injected MCMC result extends to the more complex time-varying case of simulated annealing. Modifying the noise-boosted annealing result allows in turn a noise-boosted quantum-annealing algorithm.

Figure 11:
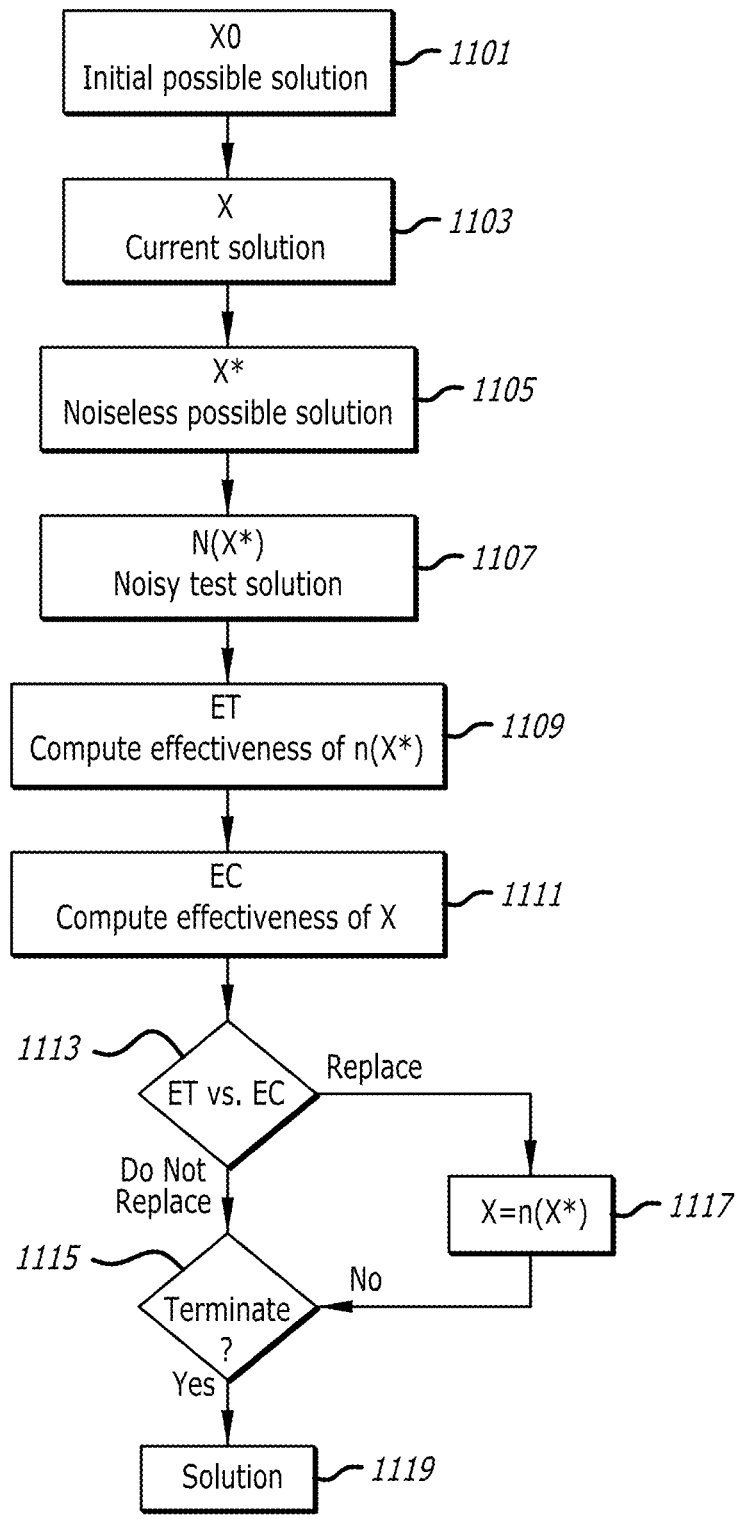
FIG. 11 illustrates a method of speeding up convergence to a solution for an optimization or search problem using Markov Chain Monte Carlo (MCMC) simulations.

FIG. 11 illustrates a method of speeding up convergence to a solution for an optimization or search problem using Markov Chain Monte Carlo (MCMC) simulations. An X0 initial possible solution step 1101 may identify at least one possible solution to the problem. This can be a fixed starting point or a randomly selected state. A current solution step 1103 may designate the starting point for the current solution. During a noiseless possible solution step 1105, a noiseless possible solution may be selected based on the current solution. This may involve selecting a random state in the vicinity of the current state according to a probability distribution, choosing a specific state according to a selection rule, or choosing several possible states and selecting one. During a noisy test solution step 1107, the noiseless possible solution may be perturbed from the current solution step 1103. The noise perturbation may have a specific functional form, such as additive or multiplicative. The noise may come from a probability density fixed during the method, from a family of related probably densities that may depend on the current solution, or from a set of unrelated probability densities. Noise perturbations that satisfy the conditions in and specifically satisfy the inequality in equation (8) may be good choices because this may guarantee a computational speed-up on average. During a compute effectiveness of noisy test solution step 1109, a functional form of the model may be evaluated, sending the noisy test solution to an external process and then receiving the effectiveness in response, using interpolation to estimate the effectiveness, or using general estimation methods to calculate the effectiveness. The process may store the effectiveness for recall in repeated iterations. During a compute effectiveness of current solution step 1111, this may be similar to step 1105, but may use the current solution in place of the noisy test solution. During a noisy test solution step 1107, the effectiveness of the noisy test solution may be compared with the effectiveness of the current solution. This process may involve a heuristic or method to determine whether to replace the current solution with the noisy test solution or retain the current solution. Some heuristics include the Metropolis-Hastings selection rule, physical interpretations such as simulated annealing that relate the effectiveness to a cost function, or Gibbs sampling which always replaces the current solution with the noisy test solution. During a comparison ET vs EC decision step 1113, the noisy test solution may be made the current solution: This may be conditional based on the result of the comparison 1113.

During a terminated decision step 1115, a decision may be made about whether to terminate the process after some number of repeats. A user may prescribe a maximum number of repeats at which the process may terminate. They may also prescribe a maximum computation time before terminating. Termination may also depend on the convergence properties of the current solution or be based on either the current solution or the effectiveness of the current with respect to some additional heuristic. During a produce solution step 1119, the solution itself may be outputted. Only the effectiveness of the current solution may be outputted as an answer to the search or optimization problem.

Figure 12:
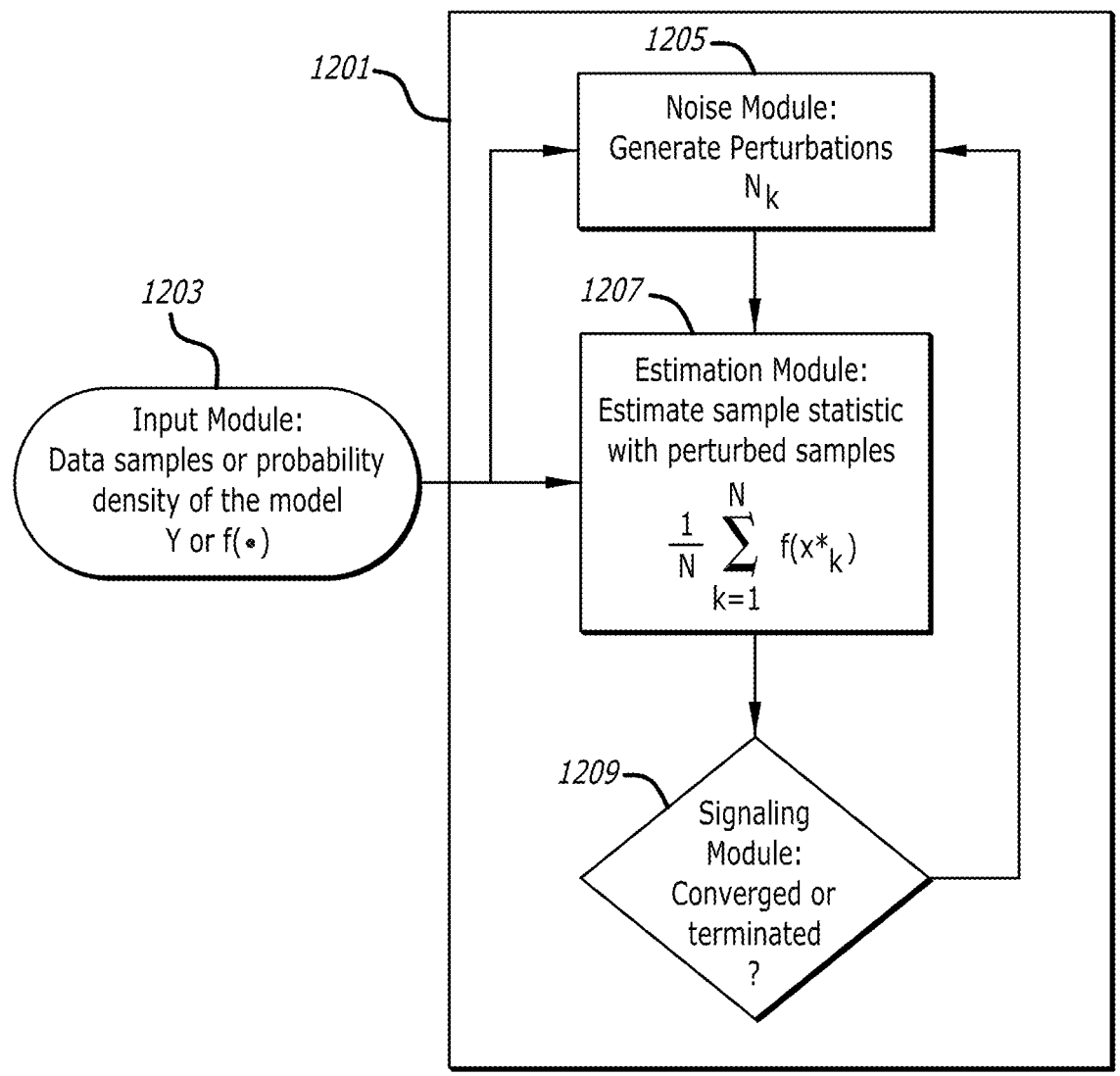
FIG. 12 illustrates an example of a quantum or classical computer system for iteratively estimating a sample statistic from a probability density of a model or from a state of a system.

FIG. 12 illustrates an example of a quantum or classical computer system 1201 for iteratively estimating a sample statistic from a probability density of a model or from a state of a system. The estimating quantum or classical computer system may include an input module 1203, a noise module 1205, an estimation module 1207, and a signaling module 1209. The quantum or classical computer system 1201 may include additional modules and/or not all these modules. Collectively, the various modules may be configured to implement any or all of the algorithms that have been discussed herein. Now set forth are examples of these implementations.

The input module 1203 may have a configuration that receives numerical data about the model or state of the system. The input module 1203 may include a network interface card, a data storage system interface, any other type of device that receives or generates data, and/or any combination of these.

The noise module 1205 may have a configuration that generates random, chaotic, or other type of numerical perturbations of the received numerical data and/or that generates pseudo-random noise.

The noise module 1205 may have a configuration that generates random, chaotic, or other type of numerical perturbations of the input numerical data that fully or partially satisfy a noisy Markov chain Monte Carlo (N-MCMC), noisy simulated annealing (N-SA), or noisy quantum annealing (N-QA) condition.

The noise module 1205 may have a configuration that generates numerical perturbations that do not depend on the received numerical data.

The estimation module 1207 may have a configuration that iteratively estimates a sample statistic from a probability density of the model or from a state of the system based on the received numerical data and then uses the numerical perturbations in the input numerical data and/or the pseudo-random noise and the input numerical data during at least one of the iterative estimates of the sample statistic.

The estimation module 1207 may have a configuration that estimates the sample statistic from a probability density of the model or state of the system using Markov chain Monte Carlo, Gibbs sampling, quantum annealing, simulated quantum annealing, or another statistical sampling, or sub-sampling method.

The estimation module 1207 may have a configuration that estimates the sample statistic from a probability density of the model or state of the system by adding, multiplying, or otherwise combining the received numerical data with the numerical perturbations.

The estimation module 1207 may have a configuration that estimates the sample statistic from a probability density of the model or from the state of the system using the numerical perturbations that do not depend on the received numerical data.

The estimation module 1207 may have a configuration that causes the magnitude of the generated numerical perturbations to eventually decay during successive estimates of the sample statistic.

The signaling module 1209 may have a configuration that signals when successive estimates of the sample statistic or information derived from successive estimates of the sample statistics differ by less than a predetermined signaling threshold or when the number of estimation iterations reaches a predetermined number or when the length of time since commencing the iterative estimation meets or exceeds a threshold.

Figure 13:
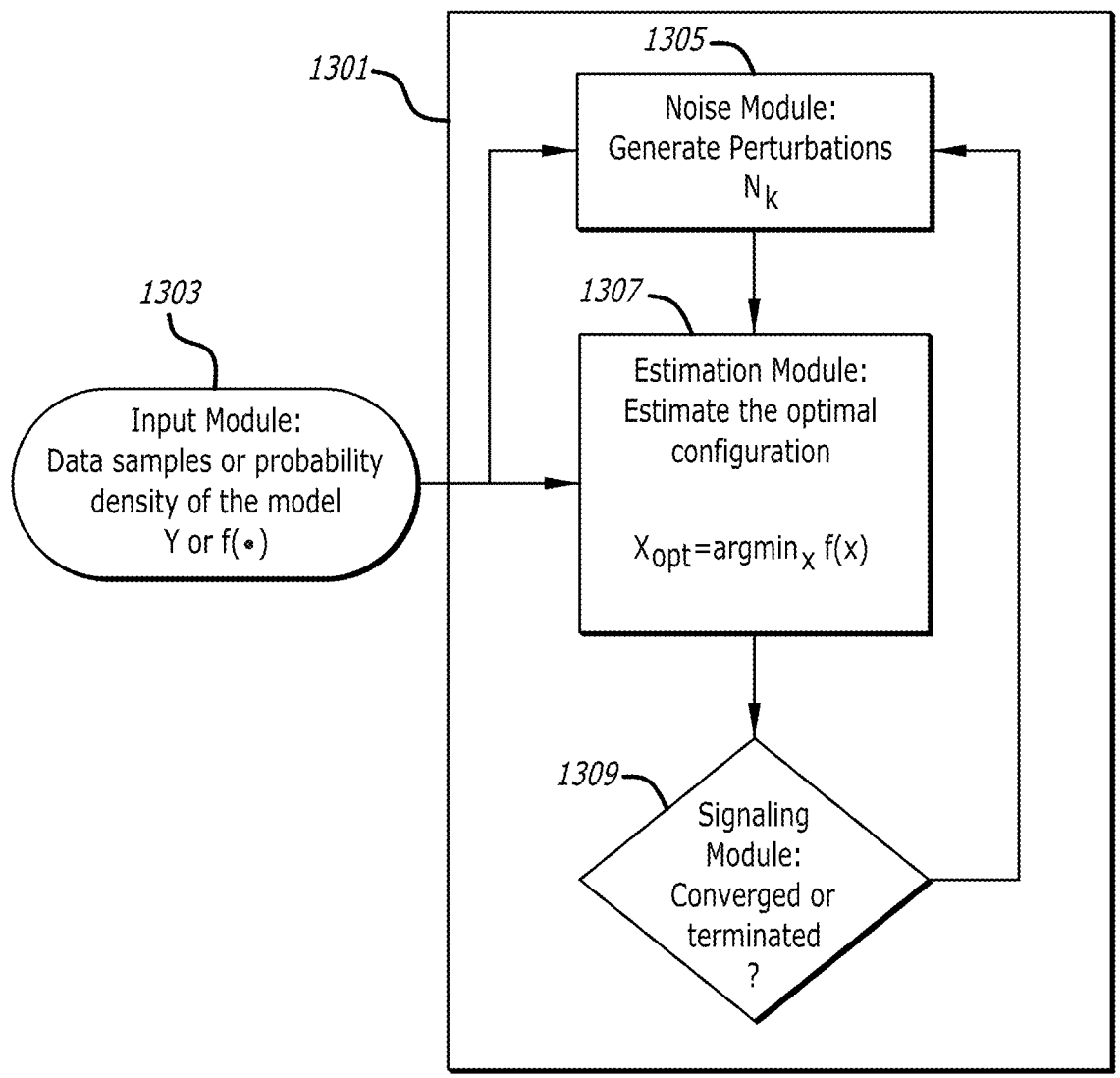
FIG. 13 illustrates an example of a quantum or classical computer system for iteratively estimating the optimal configuration of a model or state of a system.

FIG. 13 illustrates an example of a quantum or classical computer system 1301 for iteratively estimating the optimal configuration of a model or state of a system.

The estimating quantum or classical computer system may include an input module 1303, a noise module 1305, an estimation module 1307, and a signaling module 1309. The quantum or classical computer system B01 may include additional modules and/or not all the modules. Collectively, the various modules may be configured to implement any or all of the algorithms that have been discussed herein. Now set forth are examples of these implementations.

The input module 1303 may have a configuration that receives numerical data about the model or state of the system. The input module 1303 may include a network interface card, a data storage system interface, any other type of device that receives or generates data, and/or any combination of these.

The noise module 1305 may have a configuration that generates random, chaotic, or other type of numerical perturbations of the received numerical data and/or that generates pseudo-random noise.

The noise module 1305 may have a configuration that generates random, chaotic, or other type of numerical perturbations of the input numerical data that fully or partially satisfy a noisy Markov chain Monte Carlo (N-MCMC), noisy simulated annealing (N-SA), or noisy quantum annealing (N-QA) condition.

The noise module 1305 may have a configuration that generates numerical perturbations that do not depend on the received numerical data.

The estimation module 1307 may have a configuration that iteratively estimates the optimal configuration of the model or state of the system based on the numerical perturbations or the pseudo-random noise and the input numerical data during at least one of the iterative estimates of the optimal configuration.

The estimation module 1307 may have a configuration that estimates the optimal configuration of the model or state of the system using Markov chain Monte Carlo, simulated annealing, quantum annealing, simulated quantum annealing, quantum simulated annealing, or another statistical optimization or sub-optimization method.

The estimation module 1307 may have a configuration that estimates the optimal configuration of the model or state of the system by adding, multiplying, or otherwise combining the received numerical data with the numerical perturbations.

The estimation module 1307 may have a configuration that estimates the optimal configuration of the model or state of the system using the numerical perturbations that do not depend on the received numerical data.

The estimation module 1307 may have a configuration that causes the magnitude of the generated numerical perturbations to eventually decay during successive estimates of the optimal configuration.

The signaling module 1309 may have a configuration that signals when successive estimates of the optimal configuration or information derived from successive estimates of the optimal configuration differ by less than a predetermined signaling threshold or when the number of estimation iterations reaches a predetermined number or when the length of time since commencing the iterative estimation meets or exceeds a threshold.

Figure 14:
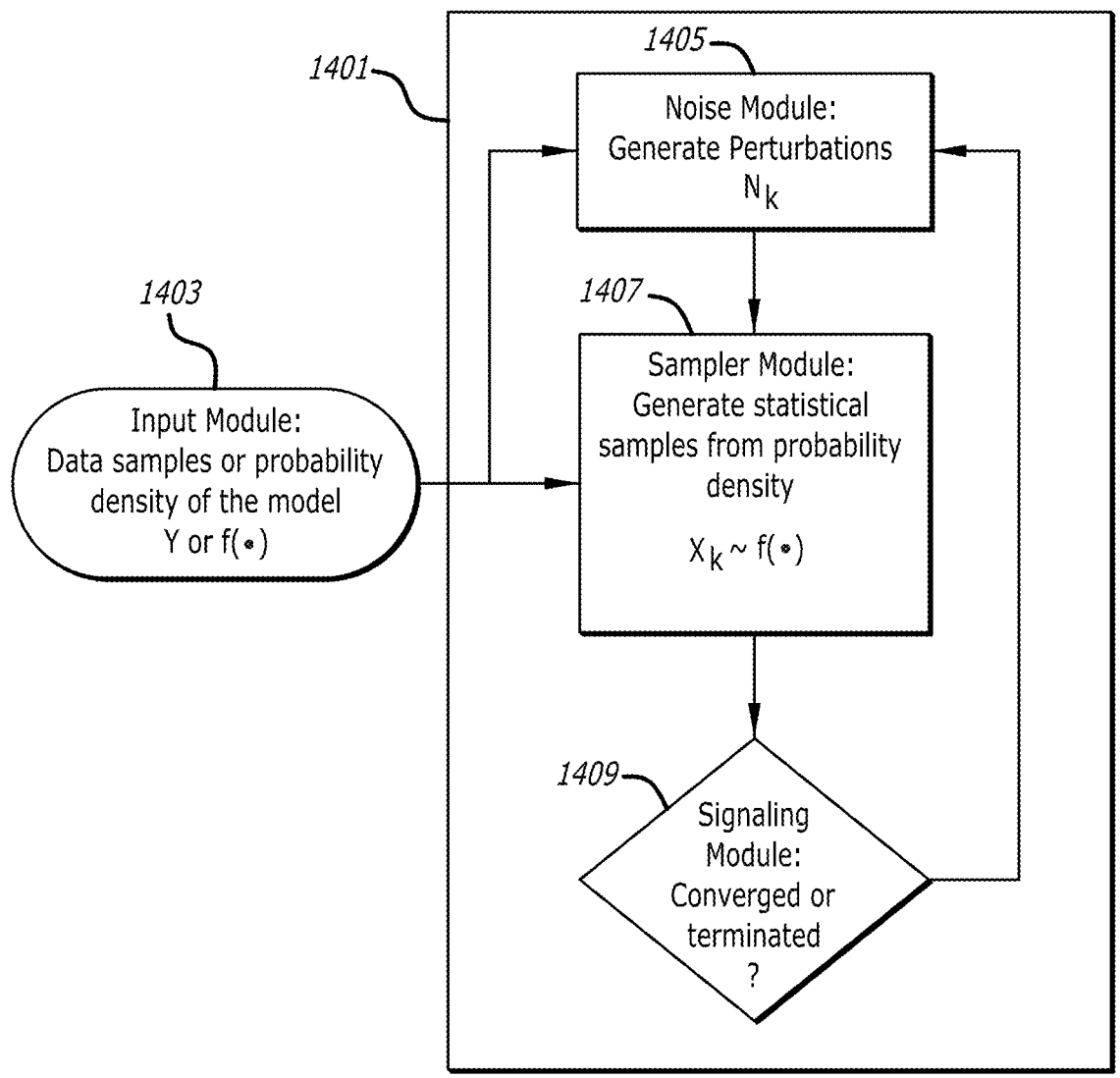
FIG. 14 illustrates an example of a quantum or classical computer system for iteratively generating statistical samples from a probability density of a model or from a state of a system.

FIG. 14 illustrates an example of a quantum or classical computer system 1401 for iteratively generating statistical samples from a probability density of a model or from a state of a system.

The sampling quantum or classical computer system may include an input module 1403, a noise module 1405, a sampler module 1407, and a signaling module 1409. The quantum or classical computer system 1401 may include additional modules and/or not all the modules. Collectively, the various modules may be configured to implement any or all of the algorithms that have been discussed herein. Now set forth are examples of these implementations.

The input module 1403 may have a configuration that receives numerical data about the model or state of the system. The input module 1403 may include a network interface card, a data storage system interface, any other type of device that receives or generates data, and/or any combination of these.

The noise module 1405 may have a configuration that generates random, chaotic, or other type of numerical perturbations of the received numerical data and/or that generates pseudo-random noise.

The noise module 1405 may have a configuration that generates random, chaotic, or other type of numerical perturbations of the input numerical data that fully or partially satisfy a noisy Markov chain Monte Carlo (N-MCMC), noisy simulated annealing (N-SA), or noisy quantum annealing (N-QA) condition.

The noise module 1405 may have a configuration that generates numerical perturbations that do not depend on the received numerical data.

The sampler module 1407 may have a configuration that iteratively generates statistical samples from the model or state of the system based on the numerical perturbations or the pseudo-random noise and the input numerical data during at least one of the iterative estimates of the optimal configuration.

The sampler module 1407 may have a configuration that generates statistical samples from the model or state of the system using Markov chain Monte Carlo, Gibbs sampling, quantum annealing, simulated quantum annealing, or another statistical sampling, or sub-sampling method.

The sampler module 1407 may have a configuration that generates statistical samples from the model or state of the system by adding, multiplying, or otherwise combining the received numerical data with the numerical perturbations.

The sampler module 1407 may have a configuration that generates statistical samples from the model or state of the system using the numerical perturbations that do not depend on the received numerical data.

The sampler module 1407 may have a configuration that causes the magnitude of the generated numerical perturbations to eventually decay during successive generated samples.

The signaling module 1409 may have a configuration that signals when information derived from successive generated samples of the probability density differ by less than a predetermined signaling threshold or when the number of iterations reaches a predetermined number or when the length of time since commencing the iterative sampler meets or exceeds a threshold.

APPENDIX: Proofs of Noise Theorems and Corollaries

Proof of Theorem 1. Observe first that $$d_t = \int_X \ln\frac{\pi(x)}{Q(x_t \mid x)}\pi(x)dx = E_X\left[\ln\frac{\pi(x)}{Q(x_t \mid x)}\right] \tag{0}$$

$$d_t(N) = \int_X \ln\frac{\pi(x)}{Q(x_t + N \mid x)}\pi(x)dx = E_X\left[\ln\frac{\pi(x)}{Q(x_t + N \mid x)}\right]. \tag{0}$$

Take expectations over $N: E_N[d_t] = d_t$ and $E_N[d_t(N)] = E_N[d_t(N)]$. Then $d_t(N) \leq d_t$ guarantees that a noise benefit occurs on average: $E_N[d_t(N)] \leq d_t$ Rewrite the joint probability density function $f(x, n \mid x = x_t)$ as the product of the marginal and conditional:

$$f(x, n \mid x = x_t) = \pi(x \mid x = x_t) f_{N \mid x_t}(n \mid x_t) \tag{0}$$

$$= \pi(x) f_{N \mid x_t}(n \mid x_t) \tag{0}$$

since the equilibrium pdf does not depend on the state $x_t$.

Suppose that $$E_N\left[\ln\frac{\pi(x_t + N)}{\pi(x_t)}\right] \leq E_{N,X}\left[\ln\frac{Q(x_t + N \mid x)}{Q(x_t \mid x)}\right]. \tag{0}$$

Expand this inequality with the factored joint pdf ((0))':

$$\int_N \ln\frac{\pi(x_t + N)}{\pi(x_t)} f_{N \mid x_t}(n \mid x_t) dn \leq \tag{0}$$
$$\int\int_{N,X} \ln\frac{Q(x_t + n \mid x)}{Q(x_t \mid x)}\pi(x) f_{N \mid x_t}(n \mid x_t) dx dn.$$

Then split the log ratios:

$\int_N \ln \pi(x_t+n)f_{N|x_t}(n|x_t)dn - \int_N \ln \pi(f_{N|x_t}(n|x_t)dn$ $\leq \int\int_{N,X} \ln Q(x_t+n|x)\pi(x)f_{N|x_t}(n|x_t)dxdn$ $-\int\int_{N,X} \ln Q(x_t|x)\pi(x)f_{N|x_t}(n|x_t)dxdn.$ (0)

Reorder the terms and factor the pdfs:

$\int_N \ln \pi(x_t+n)f_{N|x_t}(n|x_t)dn$ $-\int\int_{N,X} \ln Q(x_t+n|x)\pi(x)f_{N|x_t}(n|x_t)dxdn$ $\leq \int_N \ln \pi(x_t)f_{N|x_t}(n|x_t)dn$ $-\int\int_{N,X} \ln Q(x_t|x)\pi(x)f_{N|x_t}(n|x_t)dxdn.$ (0)

This gives $\int\int_{N,X} \ln \pi(x_t+n)\pi(x)f_{N|x_t}(n|x_t)dxdn$ $-\int\int_{N,X} \ln Q(x_t+n|x)\pi(x)f_{N|x_t}(n|x_t)dxdn$ $\leq \int\int_{N,X} \ln \pi(x_t)\pi(x)f_{N|x_t}(n|x_t)dxdn$ $-\int_{N,X} \ln Q(x_t|x)\pi(x)f_{N|x_t}(n|x_t)dxdn.$ (0)

Then $$\int\int_{N,X} \ln\frac{\pi(x_t + n)}{Q(x_t + n \mid x)}\pi(x) f_{N \mid x_t}(n \mid x_t) dx dn \leq \tag{0}$$
$$\underbrace{\int_N f_{N \mid x_t}(n \mid x_t) dn}_{=1} \int_X \ln\frac{\pi(x)}{Q(x_t \mid x)}\pi(x)dx.$$

Apply the MCMC detailed balance condition $\pi(x)Q(y \mid x) = \pi(y)Q(x \mid y)$:

$$\int\int_{N,X} \ln\frac{\pi(x_t + n)}{\frac{\pi(x_t + n)Q(x \mid x_t + n)}{\pi(x)}} \pi(x) f_{N \mid x_t}(n \mid x_t) dx dn \leq \tag{0}$$

$$\int_X \ln\frac{\pi(x_t)}{\frac{\pi(x_t)Q(x|x_t)}{\pi(x)}}\pi(x)dx.$$

Simplifying gives $$\int\int_{N,X} \ln\frac{\pi(x)}{Q(x|x_t+n)}\pi(x)f_{N|x_t}(n|x_t)dxdn \le \int_X \ln\frac{\pi(x)}{Q(x|x_t)}\pi(x)dx.$$

Then $$\int_N \left[\int_X \ln\frac{\pi(x)}{Q(x|x_t+n)}\pi(x)dx\right]f_{N|x_t}(n|x_t)dn \le \int_X \ln\frac{\pi(x)}{Q(x|x_t)}\pi(x)dx$$

iff $$\int_N D(\pi(x)PQ(x|x_t+n))f_{N|x_t}(n|x_t)dn \le D(\pi(x)PQ(x|x_t)).$$

So $$\int_N d_t(N)f_{N|x_t}(n|x_t)dn \le d_t.$$

This just restates the noise benefit:

$$E_N[d_t(N)] \le d_t.$$

Proof of Corollary 1. The following inequalities need hold only for almost all x and n:

$$Q(x|x_t+n) \ge e^A Q(x|x_t)$$

if and only if (iff)

$$\ln[Q(x|x_t+n)] \ge A + \ln[Q(x|x_t)]$$

iff $$\ln[Q(x|x_t+n)] - \ln[Q(x|x_t)] \ge A$$

iff $$\ln\frac{Q(x|x_t+n)}{Q(x|x_t)} \ge A.$$

Thus $$E_{N,X}\left[\ln\frac{Q(x|x_t+N)}{Q(x|x_t)}\right] \ge E_N\left[\ln\frac{\pi[x_t+N]}{\pi[x_t]}\right]$$

Proof of Corollary 2. Assume $$Q(x|x_t) = \frac{1}{\sigma\sqrt{2\pi}}e^{-\frac{(x-x_t)^2}{2\sigma^2}}.$$

Then $$Q(x|x_t+n) \ge e^A Q(x|x_t)$$

iff $$\frac{1}{\sigma\sqrt{2\pi}}e^{-\frac{(x-x_t-n)^2}{2\sigma^2}} \ge e^A \frac{1}{\sigma\sqrt{2\pi}}e^{-\frac{(x-x_t)^2}{2\sigma^2}}$$

iff $$e^{-\frac{(x-x_t-n)^2}{2\sigma^2}} \ge e^{A-\frac{(x-x_t)^2}{2\sigma^2}}$$

iff $$-\frac{(x-x_t-n)^2}{2\sigma^2} \ge A - \frac{(x-x_t)^2}{2\sigma^2}$$

iff $$-(x-x_t-n)^2 \ge 2\sigma^2 A - (x-x_t)^2$$

iff $$-x^2 + 2xx_t + 2xn - x_t^2 - 2x_tn - n^2 \ge 2\sigma^2 A - x^2 + 2xx_t - x_t^2$$

iff $$2xn - 2x_tn - n^2 \ge 2\sigma^2 A$$

$$n(n - 2(x_t - x)) \le -2\sigma^2 A.$$

Proof of Corollary 3. Assume $$Q(x|x_t) = \frac{1}{\sigma\sqrt{2\pi}}e^{-\frac{(x-x_t)^2}{2\sigma^2}}.$$

Then $$Q(x|nx_t) \ge e^A Q(x|x_t)$$

iff $$\frac{1}{\sigma\sqrt{2\pi}}e^{-\frac{(x-nx_t)^2}{2\sigma^2}} \ge e^A \frac{1}{\sigma\sqrt{2\pi}}e^{-\frac{(x-x_t)^2}{2\sigma^2}}$$

iff $$e^{-\frac{(x-nx_t)^2}{2\sigma^2}} \ge e^{A-\frac{(x-x_t)^2}{2\sigma^2}}$$

iff $$-\frac{(x-nx_t)^2}{2\sigma^2} \ge A - \frac{(x-x_t)^2}{2\sigma^2}$$

iff $$-(x-nx_t)^2 \ge 2\sigma^2 A - (x-x_t)^2$$

iff $$-x^2 + 2xnx_t = n^2x_t^2 \ge 2\sigma^2 A - x^2 + 2xx_t - x_t^2$$

iff $$2xnx_t = n^2x_t^2 - 2xx_t + x_t^2 \ge 2\sigma^2 A$$

iff $$nx_t(2x - nx_t) - x_t(2x - x_t) \le -2\sigma^2 A.$$

Proof of Corollary 4.

$$Q(x\mid x_t) = \frac{1}{\pi d\left[1+\left(\frac{x-m}{d}\right)^2\right]}$$

Therefore $$Q(x\mid x_t + n) \geq e^A Q(x\mid x_t)$$

iff $$\frac{1}{\pi d\left[1+\left(\frac{x-x_t-n}{d}\right)^2\right]} \geq e^A \frac{1}{\pi d\left[1+\left(\frac{x-x_t}{d}\right)^2\right]}$$

iff $$1+\left(\frac{x-x_t-n}{d}\right)^2 \leq e^{-A}\left[1+\left(\frac{x-x_t}{d}\right)^2\right]$$

$$\leq e^{-A} + e^{-A}\left(\frac{x-x_t}{d}\right)^2$$

iff $$\left(\frac{x-x_t-n}{d}\right)^2 - e^{-A}\left(\frac{x-x_t}{d}\right)^2 \leq e^{-A} - 1$$

iff $$(x-x_t-n)^2 - e^{-A}(x-x_t)^2 \leq d^2(e^{-A}-1)$$

$$(x-x_t)^2 + n^2 + 2n(x-x_t) - e^{-A}(x-x_t)^2 \leq$$

$$(1 - e^{-A})(x-x_t)^2 + n^2 + 2n(x-x_t) \leq$$

iff $$n^2 \leq d^2(e^{-A}-1) + (e^{-A}-1)(x-x_t)^2 - 2n(x-x_t)$$

$$\leq (e^{-A}-1)(d^2 + (x-x_t)^2) - 2n(x-x_t)$$

Proof of N-SA Theorem and Corollaries

Proof of Theorem 2. The proof uses Jensen's inequality for concave function g [William Feller. *An Introduction to Probability Theory and Its Applications, Volume* 2. John-Wiley & Sons, 2nd edition, 2008].

$$g(E[X]) \geq E[g(X)]$$

for integrable random variable X. The concavity of the natural logarithm gives $$\ln E[X] \geq E[\ln X].$$

Then $$\alpha(T) = \min\left\{1, \exp\left(-\frac{\Delta E}{T}\right)\right\}$$

$$= \min\left\{1, \exp\left(-\frac{E^*_{t+1} - E_t}{T}\right)\right\}$$

$$= \min\left\{1, \frac{\exp\left(-\frac{E^*_{t+1}}{T}\right)}{\exp\left(-\frac{E_t}{T}\right)}\right\}$$

-continued $$= \min\left\{1, \frac{\frac{1}{Z}\cdot \pi(x^*_{t+1}; T)}{\frac{1}{Z}\cdot \pi(x_t; T)}\right\}$$

$$= \min\left\{1, \frac{\pi(x^*_{t+1}; T)}{\pi(x_t; T)}\right\}$$

where the normalizing constant Z is $$Z = \int_X \exp\left(-\frac{C(x)}{T}\right)dx.$$

Let N be a noise random variable that perturbs the candidate state $x_{t-1}^*$. We want to show that $$E_N[\alpha_N(T)] = E_N\left[\min\left\{1, \frac{\pi(x^*_{t+1} + N; T)}{\pi(x_t; T)}\right\}\right]$$

$$\geq \min\left\{1, \frac{\pi(x^*_{t+1}; T)}{\pi(x_t; T)}\right\}$$

$$= \alpha(T).$$

It suffices to show that $$E_N\left[\frac{\pi(x^*_{t+1} + N; T)}{\pi(x_t; T)}\right] \geq \frac{\pi(x^*_{t+1}; T)}{\pi(x_t; T)}$$

iff $$E_N[\pi(x^*_{t+1} + N; T)] \geq \pi(x^*_{t+1}; T)$$

since $\pi(x_t) \geq 0$ because $\pi$ is a pdf. Suppose $$E_N\left[\ln\frac{\pi(x_t+N)}{\pi(x_t)}\right] \geq 0.$$

Then $$E_N[\ln\pi(x_t+N) - \ln\pi(x_t)] \geq 0$$

iff $$E_N[\ln\pi(x_t+N)] \geq E_N[\ln\pi(x_t)]$$

iff (Jensen's inequality)

$$\ln E_N[\pi(x_t+N)] \geq E_N[\ln\pi(x_t)]$$

iff $$\ln E_N[\pi(x_t+N)] \geq \int_N \ln\pi(x_t) f_N(n\mid x_t) dn$$

iff $$\ln E_N[\pi(x_t+N)] \geq \ln\pi(x_t)\underbrace{\int_N f_N(n\mid x_t)dn}_{=1}$$

iff

-continued $$\ln E_N[\pi(x_t + N)] \geq \ln \pi(x_t) \qquad (0)$$

iff $$E_N[\pi(x_t + N)] \geq \pi(x_t) \qquad (0)$$

Proof of Corollary 5. We want to show that $$E_N[\beta_N(T)] = E_N\left[\min\left\{1, m\left(\frac{\pi(x_{t+1}^* + N; T)}{\pi(x_t; T)}\right)\right\}\right] \qquad (0)$$

$$\geq \min\left\{1, m\left(\frac{\pi(x_{t+1}^*; T)}{\pi(x_t; T)}\right)\right\} \qquad (0)$$

$$. = \beta(T) \qquad (0)$$

It suffices to show that $$E_N\left[m\left(\frac{\pi(x_{t+1}^* + N; T)}{\pi(x_t; T)}\right)\right] \geq m\left(\frac{\pi(x_{t+1}^*; T)}{\pi(x_t; T)}\right). \qquad (0)$$

Suppose $$E_N\left[\ln \frac{\pi(x_t + N; T)}{\pi(x_t; T)}\right] \geq 0. \qquad (0)$$

Then we proceed as in the proof of the N-SA Theorem:

$$E_N[\pi(x_t+N)] \geq \pi(x_t). \qquad (0)$$

Then the inequality $$\frac{E_N[\pi(x_t + N)]}{\pi(x_t; T)} \geq \frac{\pi(x_t)}{\pi(x_t; T)} \qquad (0)$$

holds because $\pi(x_t) \geq 0$ since $\pi$ is a pdf. We can rewrite this inequality as $$E_N\left[\frac{\pi(x_t + N)}{\pi(x_t; T)}\right] \geq \frac{\pi(x_t)}{\pi(x_t; T)}. \qquad (0)$$

So $$m\left(E_N\left[\frac{\pi(x_t + N)}{\pi(x_t; T)}\right]\right) \geq m\left(\frac{\pi(x_t)}{\pi(x_t; T)}\right) \qquad (0)$$

since m is increasing and $$E_N\left[m\left(\frac{\pi(x_t + N)}{\pi(x_t; T)}\right)\right] \geq m\left(\frac{\pi(x_t)}{\pi(x_t; T)}\right) \qquad (0)$$

since m is convex and so Jensen's inequality applies.

Proof of Corollary 6. Suppose $$E_N[g(x_t+N)] \geq g(x_t). \qquad (0)$$

Then $$E_N[\ln e^{g(x_t+N)}] \geq \ln e^{g(x_t)} \qquad (0)$$

and the following inequalities are equivalent:

$$E_N[\ln(e^{g(x_t+N)})] \geq \ln(e^{g(x_t)}) \qquad (0)$$

Unless otherwise indicated, the various modules that have been discussed herein are implemented with a specially-configured computer system specifically configured to perform the functions that have been described herein for the component. The computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The computer system may include software (e.g., one or more operating systems, device drivers, application programs, and/or communication programs). When software is included, including the software that has been described herein, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A quantum or classical computer system for iteratively estimating a sample statistic from a probability density of a model or from a state of a system comprising:
   an input module that has a configuration that receives numerical data about the system as received numerical data;
   a noise module that has a configuration that generates random, chaotic, or other type of numerical perturbations of the received numerical data or that generates pseudo-random noise;
   an estimation module that has a configuration that iteratively estimates the sample statistic from the probability density of the model or from the state of the system based on numerical perturbations or pseudo-random noise and the received numerical data during at least one of the iterative estimates of the sample statistic, the estimation module including a quantum annealer configured to model quantum annealing as a spin glass; and
   a signaling module that has a configuration that signals when successive estimates of the sample statistic or information derived from successive estimates of the sample statistic differ by less than a predetermined signaling threshold or when a number of estimation iterations reaches a predetermined number or when a length of time since commencing the iterative estimates meets or exceeds a time threshold,
   wherein:
      the estimation module has a configuration that estimates the sample statistic from the probability density of the model or state of the system using Markov chain Monte Carlo, Gibbs sampling, quantum annealing, simulated quantum annealing, or another statistical sampling, or sub-sampling method;
      the noise module has a configuration that generates random, chaotic, or other type of numerical perturbations of the received numerical data that fully or partially satisfy a noisy Markov chain Monte Carlo (N-MCMC) condition; and
      the estimation module has a configuration that estimates the sample statistic from the probability density of the model or state of the system by adding, multiplying, or otherwise combining the received numerical data with numerical perturbations.

2. The quantum or classical computer system of claim 1 wherein the estimation module has a configuration that causes the magnitude of generated numerical perturbations to eventually decay during successive estimates of the sample statistic.

3. The quantum or classical computer system of claim 1 wherein:
   the noise module has a configuration that generates numerical perturbations that do not depend on the received numerical data; and
   the estimation module has a configuration that estimates the sample statistic from the probability density of the model or from the state of the system using the numerical perturbations that do not depend on the received numerical data.

4. A quantum or classical computer system for iteratively estimating an optimal configuration of a model or state of a system comprising:
   an input module that has a configuration that receives numerical data about the system;
   a noise module that has a configuration that generates random, chaotic, or other type of numerical perturbations of the received numerical data or that generates pseudo-random noise;
   an estimation module that has a configuration that iteratively estimates the optimal configuration of the model or state of the system based on numerical perturbations or the pseudo-random noise and the received numerical data during at least one of the iterative estimates of the optimal configuration, the estimation module including a quantum annealer configured to model quantum annealing as a spin glass;

a signaling module that has a configuration that signals when successive estimates of the optimal configuration or information derived from successive estimates of the optimal configuration differ by less than a predetermined signaling threshold or when a number of estimation iterations reaches a predetermined number or when the length of time since commencing the iterative estimation meets or exceeds a time threshold, wherein:

the estimation module has a configuration that estimates the optimal configuration of the model or state of the system using Markov chain Monte Carlo, simulated annealing, quantum annealing, simulated quantum annealing, quantum simulated annealing, or another statistical optimization or sub-optimization method;

the noise module has a configuration that generates random, chaotic, or other type of numerical perturbations of the received numerical data that fully or partially satisfy a noisy Markov chain Monte Carlo (N-MCMC), noisy simulated annealing (N-SA), or noisy quantum annealing (N-QA) condition; and the estimation module has a configuration that estimates the optimal configuration of the system by adding, multiplying, or otherwise combining the received numerical data with numerical perturbations.

5. The quantum or classical computer system of claim 4 wherein the estimation module has a configuration that causes the magnitude of generated numerical perturbations to eventually decay during successive estimates of the optimal configuration.

6. The quantum or classical computer system of claim 4 wherein:

the noise module has a configuration that generates numerical perturbations that do not depend on the received numerical data; and the estimation module has a configuration that estimates the optimal configuration of the model or state of the system using the numerical perturbations that do not depend on the received numerical data.

7. A non-transitory, tangible, computer-readable storage media containing a program of instructions that causes a computer system having a processor running the program of instructions to implement functions of the modules described in claim 1.

8. The storage media of claim 7 wherein the estimation module has a configuration that causes the magnitude of generated numerical perturbations to eventually decay during successive estimates of the sample statistic.

9. The storage media of claim 7 wherein the noise module has a configuration that generates numerical perturbations that do not depend on the received numerical data; and the estimation module has a configuration that estimates the sample statistic from the probability density of the model or from the state of the system using the numerical perturbations that do not depend on the received numerical data.

10. A non-transitory, tangible, computer-readable storage media containing a program of instructions that causes a computer system having a processor running the program of instructions to implement functions of the modules described in claim 4.

11. The storage media of claim 10 wherein the instructions cause the computer system to implement functions of the modules in which the estimation module has a configuration that causes the magnitude of generated numerical perturbations to eventually decay during successive estimates of the optimal configuration.

12. The storage media of claim 7 wherein the instructions cause the computer system to implement functions of the modules in which:

the noise module has a configuration that generates numerical perturbations that do not depend on the received numerical data; and the estimation module has a configuration that estimates the optimal configuration of the model or state of the system using the numerical perturbations that do not depend on the received numerical data.

13. The quantum or classical computer system of claim 1, wherein the quantum annealer includes superconducting flux qubits with programmable couplings.

* * * * *